US012666492B2

(12) United States Patent
Park et al.

(10) Patent No.: US 12,666,492 B2
(45) Date of Patent: Jun. 23, 2026

(54) DRX OPERATION METHOD AND DEVICE IN WIRELESS COMMUNICATION SYSTEM

(71) Applicant: Innovative Technology Lab Co., Ltd., Seoul (KR)

(72) Inventors: Dong Hyun Park, Seoul (KR); Won Seok Lee, Seoul (KR); Sung Jun Yoon, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 321 days.

(21) Appl. No.: 18/351,331

(22) Filed: Jul. 12, 2023

(65) Prior Publication Data

US 2023/0363048 A1     Nov. 9, 2023

Related U.S. Application Data

(63) Continuation of application No. PCT/KR2022/095010, filed on Jan. 11, 2022.

(30) Foreign Application Priority Data

Jan. 12, 2021    (KR) ........................ 10-2021-0003898

(51) Int. Cl.
| | |
|---|---|
| *H04W 72/04* | (2023.01) |
| *H04L 1/1829* | (2023.01) |
| *H04W 72/1263* | (2023.01) |
| *H04W 72/25* | (2023.01) |
| *H04W 76/28* | (2018.01) |
| *H04L 1/1812* | (2023.01) |

(52) U.S. Cl.
CPC .......... *H04W 76/28* (2018.02); *H04L 1/1854* (2013.01); *H04W 72/1263* (2013.01); *H04W 72/25* (2023.01); *H04L 1/1812* (2013.01)

(58) Field of Classification Search
None
See application file for complete search history.

(56) References Cited

U.S. PATENT DOCUMENTS

2020/0413295 A1   12/2020   Li et al.
2022/0369417 A1*   11/2022   Park ................. H04W 52/0258

FOREIGN PATENT DOCUMENTS

| EP | 4358626 A1 | 4/2024 |
|---|---|---|
| KR | 1020190039101 A | 4/2019 |
| WO | 2021002723 A1 | 1/2021 |

OTHER PUBLICATIONS

International Search Report for International Patent Application No. PCT/KR2022/095010, dated Mar. 31, 2022.

(Continued)

*Primary Examiner* — Willie J Daniel, Jr.

(57) ABSTRACT

In a wireless communication system, a method of supporting sidelink (SL) communication by a UE may be provided. In this case, the method of supporting SL communication by the UE may comprise setting an SL DRX configuration through a higher layer, setting an SL DRX-related cycle and an SL DRX-related timer based on the set SL DRX configuration, receiving sidelink control information (SCI) and setting an SCI-based SL DRX-related cycle and an SCI-based SL DRX-related timer based on time resource allocation information of the received SCI.

20 Claims, 22 Drawing Sheets

(56)              References Cited

OTHER PUBLICATIONS

Written Opinion for International Patent Application No. PCT/KR2022/095010, dated Mar. 31, 2022.

3rd Generation Partnership Project; Technical Specification Group Radio Access Network; NR; NR and NG-RAN Overall Description; Stage 2 (Release 16), 3GPP TS 38.300 V16.4.0 (Dec. 2020).

3rd Generation Partnership Project; Technical Specification Group Radio Access Network; NR; Medium Access Control (MAC) protocol specification (Release 16), 3GPP TS 38.321 V16D.3.0 (Dec. 2020).

3rd Generation Partnership Project; Technical Specification Group Radio Access Network; NR; Radio Resource Control (RRC) protocol specification (Release 16), 3GPP TS 38.331 V16.3.1 (Jan. 2021).

LG Electronics, "Discussion on physical layer design considering sidelink DRX operation", 3GPP TSG RAN WG1 #103-e, R1-2007897, E-Meeting, Oct. 26-Nov. 13, 2020.

Lenovo et al., "Sidelink resource allocation for Power saving", 3GPP TSG RAN WG1 #103-e, R1-2008917, e-Meeting, Oct. 26-Nov. 13, 2020.

Oppo, "Discussion on DRX for sidelink", 3GPP TSG-RAN WG2 #112-e, R2-2008772, e-Meeting, Nov. 2020.

Oppo, "Power saving mechanisms in NR sidelink", 3GPP TSG RAN WG1 #103-e, R1-2008239, e-Meeting, Oct. 26-Nov. 13, 2020.

European Search Report for EP Patent Application No. 22739844.3, dated Nov. 11, 2024.

* cited by examiner

FIG. 16

DRX OPERATION METHOD AND DEVICE IN WIRELESS COMMUNICATION SYSTEM

CROSS-REFERENCE TO RELATED APPLICATIONS

This application is a continuation of International patent application No. PCT/KR2022/095010, filed on Jan. 11, 2022, which claims priority from and the benefit of Korean Patent Application No. 10-2021-0003898, filed on Jan. 12, 2021, each of which is hereby incorporated by reference in its entirety.

BACKGROUND

The present disclosure is directed to a method of discontinuous reception (DRX) operation in the wireless communication systems, more specifically, to a method and apparatus for performing the DRX operations in a new radio (NR) vehicle to everything (V2X).

The International Mobile Telecommunication (IMT) framework and standard have been developed by the International Telecommunication Union (ITU). Also, a continuous discussion about 5-th generation (5G) communication is ongoing through a program called "IMT for 2020 and beyond".

To satisfy the requirements requested by "IMT for 2020 and beyond", various proposals have been made to support various numerologies about a time-frequency resource unit standard by considering various scenarios, service requirements, and potential system compatibility in a 3-rd Generation Partnership Project (3GPP) new radio (NR) system.

Also, to overcome a poor channel environment, such as high pathloss, phase-noise, and frequency offset, that occurs on a high carrier frequency, the NR system may support transmission of a physical signal/channel through a plurality of beams. Through this, the NR system may support applications, such as, enhanced Mobile Broadband (eMBB), massive Machine Type Communications (mMTC)/ultra Machine Type Communications (uMTC), and Ultra Reliable and Low Latency Communications (URLLC).

Also, Vehicle-to-everything (V2X) communication, a communication method of exchanging or sharing road infrastructures during driving and information such as traffic conditions through communication with other vehicles, may be considered. V2X may include, for example, vehicle-to-vehicle (V2V), which may refer to a long term evolution (LTE)-based/New Radio (NR) based communication between vehicles, vehicle-to-pedestrian (V2P), which may refer to a LTE-based/NR-based communication between a vehicle and a user equipment (UE) carried by a user, and a vehicle-to-infrastructure/network (V2I/N), which may refer to a LTE-based/NR-based communication between a vehicle and a roadside unit (RSU)/network. The RSU may be a transportation infrastructure entity configured by a base station or a fixed UE, such as an entity that transmits a speed notification to a vehicle.

However, in an environment where there are a plurality of UEs, a collision between resources for V2X may occur, thereby causing a delay in a V2X communication.

SUMMARY

A technical subject of the present disclosure may provide a method and apparatus for a DRX operation in wireless communication systems.

A technical subject of the present disclosure may provide a method and apparatus for operating an NR SL (SL) DRX.

A technical subject of the present disclosure may provide a method and apparatus for setting a common NR SL DRX configuration and an independent NR SL DRX configuration.

A technical subject of the present disclosure may provide a method and apparatus for setting an additional NR SL DRX configuration based on SL control information (SCI).

Technical subjects achievable from the present disclosure are not limited to the aforementioned technical subjects and other technical subjects still not described herein may be clearly understood by one of ordinary skill in the art to which the disclosure pertains from the following description.

In a wireless communication system, according to an aspect of the present disclosure, a method for a UE to support SL communication may be provided. Here, the method of supporting SL communication by a UE may include: setting an SL DRX configuration via a higher layer; setting an SL DRX-related period and an SL DRX-related timer based on the set SL DRX configuration; receiving an SCI; and setting an SCI-based SL DRX-related period and an SCI-based SL DRX-related timer based on time resource allocation information of the received SCI.

Also, a method for a UE to support SL communication in a wireless communication system, according to one aspect of the present disclosure, may be provided. Here, the method of supporting SL communication by a UE may comprise: setting an SL DRX configuration via a higher layer; setting an SL DRX-related period and an SL DRX-related timer based on the set SL DRX configuration; receiving an SCI; determining a first SL transmission time and a second sidlink transmission time indicated by time resource allocation information of the received SCI; and controlling an active interval for the UE based on the SL time gap threshold value and said second SL transmission time.

According to the present disclosure, a method and apparatus may be provided to flexibly set up an NR SL DRX configuration in consideration of the SL communication environments.

According to the present disclosure, a method and apparatus may be provided for setting an additional NR SL DRX configuration to maintain an active state of a UE in a plurality of time resources indicated by the SCI.

According to the present disclosure, a method and apparatus for flexibly adjusting a DRX cycle and DRX-related timers of an NR SL DRX in consideration of the SL communication environment may be provided.

The effects which can be acquired by the disclosure includes but is not limited to the described effects above, and other effects that have not been mentioned may be clearly understood by those skilled in the art from the following description.

BRIEF DESCRIPTION OF THE DRAWINGS

FIG. 16 illustrates a method for setting a timer by a mode 2 UE to which the present disclosure may apply.

DETAILED DESCRIPTION

Figure 1:
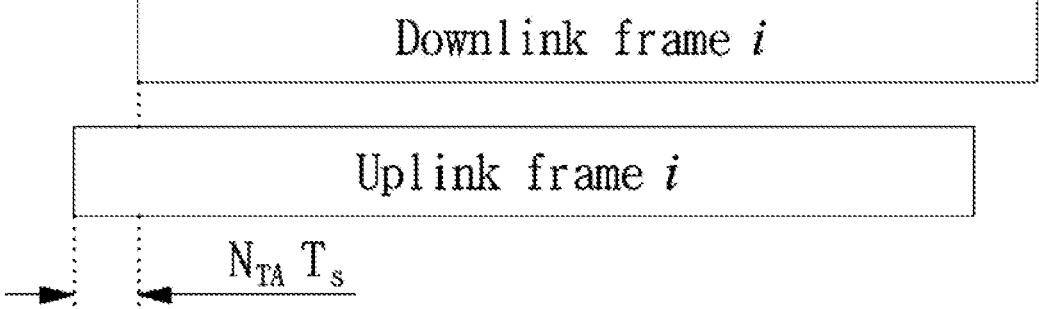
FIG. 1 illustrates an example of an NR frame structure to which the present disclosure may apply.

Various examples of the present disclosure will be described more fully hereinafter with reference to the accompanying drawings such that one of ordinary skill in the art to which the present disclosure pertains may easily implement the examples. However, the present disclosure may be implemented in various forms, and is not limited to the examples described herein.

In describing the examples of the present disclosure, a detailed description on known configurations or functions may be omitted for clarity and conciseness. Throughout the drawings and the detailed description, unless otherwise described, the same drawing reference numerals are understood to refer to the same elements, features, and structures.

It will be understood that when an element is referred to as being "connected to," "coupled to," or "accessed to" another element, it can be directly connected, coupled, or accessed to the other element or the intervening elements may be present. Also, it will be further understood that when an element is described to "comprise/include" or "have" another element, it specifies the presence of another element, but does not preclude the presence of another element unless otherwise described.

Further, the terms such as first, second, and the like, may be used herein to describe the elements in the description herein. These terms are used to distinguish one element from another element. Thus, the terms do not limit the element, an arrangement order, a sequence or the like. Therefore, a first element in an example may be referred to as a second element in another example. Likewise, a second element in an example may be referred to as a first element in another example.

Herein, distinguishing elements are merely provided to clearly explain the respective features and do not represent the elements as necessarily separate from each other. That is, in a plurality of elements may be integrated into a single hardware or software unit. Also, a single element may be distributed to a plurality of hardware or software units. Therefore, unless particularly described, the integrated or distributed example is also included in the scope of the present disclosure.

Herein, the elements described in various examples may not be necessarily essential and may be partially selectable. Therefore, an example including a partial set of elements described in an example is also included in the scope of the present disclosure. Also, an example that additionally includes another element to the elements described in various examples is also included in the scope of the present disclosure.

The description described herein is related to a wireless communication network, and an operation performed in a wireless communication network may be performed in the process of controlling a network and transmitting data by a system that controls a wireless network, e.g., a base station, or may be performed in a user equipment.

It is apparent that various operations performed for communication with a UE in a network, including a base station and a plurality of network nodes, may be performed by the base station or by other network nodes in addition to the base station. Here, the term 'base station (BS)' may be interchangeably used with other terms, for example, a fixed station, a Node B, an eNodeB (eNB), a gNodeB (gNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes the meaning of transmitting, or receiving information or a signal through the corresponding channel. For example, transmitting a control channel indicates transmitting control information or a signal through the control channel. Likewise, transmitting a data channel indicates transmitting data information or a signal through the data channel.

In the following description, although the term "new radio (NR) system" is used to distinguish a system according to various examples of the present disclosure from the existing system, the scope of the present disclosure is not limited thereto.

A new radio (NR) system supports various subcarrier spacings (SCSs) by considering various scenarios, service requirements, potential system compatibility, and the like. Also, to overcome a poor channel environment, such as high pathloss, phase-noise, and frequency offset, that occurs on a high carrier frequency, the NR system may support transmission of a physical signal/channel through a plurality of beams. Through this, the NR system may support applications, such as, enhanced Mobile Broadband (eMBB), massive Machine Type Communications (mMTC)/ultra Machine Type Communications (uMTC), and Ultra Reliable and Low Latency Communications (URLLC).

Here, the 5G mobile communication technology may be defined by including the existing Long Term Evolution-Advanced (LTE-A) system as well as the aforementioned NR system. That is, the 5G mobile communication technology may operate by considering the backward compatibility with a previous system as well as a newly defined NR system. Therefore, following the 5G mobile communication may include technology operating based on the NR system and a technology operating based on a previous system (e.g., LTE-A, LTE), but is not limited to a specific system.

First of all, the physical resource structure of the NR system, to which the present disclosure is applied, will be briefly described.

FIG. 1 illustrates an example of an NR frame structure according to an example of the present disclosure.

In the NR, a basic unit of a time domain may be $T_C=1/(\Delta f_{max} \cdot N_f)$. Here, $\Delta f_{max}=480 \cdot 10^3$ and $N_f=4096$. Also, $\kappa=T_s/T_C=64$ may be a constant in a multiple relationship between an NR time unit and an LTE time unit. In LTE, $T_s=1/(\Delta f_{ref} \cdot N_f, ref)$, $\Delta f_{ref}=15 \cdot 10^3$ and $N_{f,ref}=2048$ may be defined as a reference time unit. The constants for the multiple relationship between the NR time base unit and the LTE time base unit may be defined as $k=T_s/T_C=64$.

Referring to FIG. 1, a time structure of a frame for a downlink/uplink (DL/UL) transmission may include $T_f=(\Delta f_{max} N_f/100)$. $T_s=10$ ms. Here, a single frame may include 10 subframes corresponding to $T_{sf}=(\Delta f_{max} N_f/1000)$. $T_s=1$ ms. A number of consecutive orthogonal frequency division multiplexing (OFDM) symbols per subframe may be $$N_{symb}^{subframe,\mu} = N_{symb}^{slot} N_{slot}^{subframe,\mu}.$$

Also, each frame may be divided into two half frames and the half frames may include 0~4 subframes and 5~9 subframes. Here, the half frame 1 may include 0~4 subframes and the half frame 2 may include 5~9 subframes.

The $N_{TA}$ represents the timing advance (TA) between downlink (DL) and uplink (UL). Here, a transmission timing of the uplink transmission frame i is determined based on a downlink reception timing at a UE according to the following Equation 1.

$$T_{TA}=(N_{TA}+N_{TA,offset})T_C \quad \text{[Equation 1]}$$

The $N_{TA,offset}$ denotes a TA offset value occurring due to a duplex mode difference and the like. Basically, in a frequency division duplex (FDD), $N_{TA,offset}=0$. In a time division duplex (TDD), $N_{TA,offset}$ may be defined as a fixed value by considering a margin for a DL-UL switching time. For example, in the TDD (Time Division Duplex) of RF1 (Frequency Range 1), which is a sub-6 GHZ or less frequency, $N_{TA,offset}$ may be 39936$T_C$ or 2600$T_C$. 39936$T_C$=20.327 μs and 25600$T_C$=13.030 μs. Also, in FR2 (Frequency Range 2), which is a millimeter wave (mm-Wave), the $N_{TA,offset}$ may be 13792$T_C$. At this time, 39936$T_C$=7.020 μs.

Figure 2:
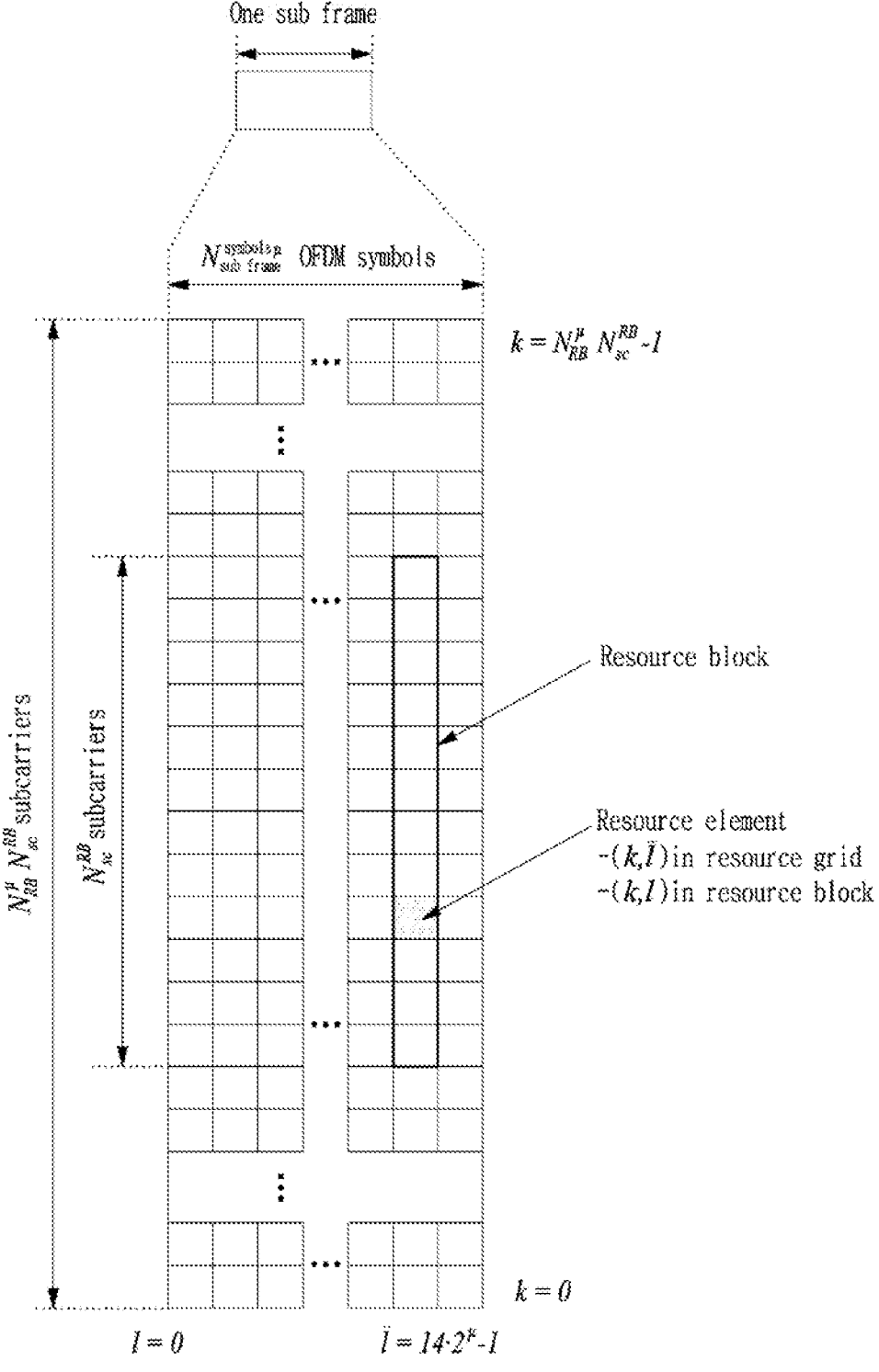
FIG. 2 illustrates an NR resource structure to which the present disclosure may apply.

FIG. 2 illustrates an NR resource structure to which the present disclosure may apply.

A resource element within a resource grid may be indexed based on each subcarrier spacing. Here, a single resource grid may be generated for each antenna port and for each subcarrier spacing. The uplink/downlink transmission and reception may be performed based on a corresponding resource grid.

A resource block (RB) on a frequency domain is configured of 12 REs and for every 12 Res, an index for one RB ($n_{PRB}$) may be configured. The index for RB may be utilized within a specific frequency band or system bandwidth. The index for RB may be defined as shown in Equation 2 below. Here, the $N^{RB}_{sc}$ represents the number of subcarriers per one RB and k represents the subcarrier index.

$$n_{PRB} = \left\lfloor \frac{k}{N_{sc}^{RB}} \right\rfloor \quad \text{[Equation 2]}$$

Numerologies may be variously configured to meet the various services and requirements of the NR system. For example, one subcarrier spacing (SCS) may be supported in the LTE/LTE-A system, but a plurality of SCS may also be supported in the NR system.

A new numerology for the NR system that supports the plurality of SCSs may operate in a frequency range or carrier, such as 3 GHz or less, 3 GHZ-6 GHZ, 6 GHZ-52.6 GHz, or 52.6 GHz or more, to solve the issue that a wide bandwidth is unavailable in a frequency range or carrier such as 700 MHz or 2 GHz Table 1 below shows an example of the numerologies supported by the NR system.

TABLE 1

| u | $\Delta f = 2^u \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Referring to the above Table 1, the numerologies may be defined based on an SCS, a cyclic prefix (CP) length, and a number of OFDM symbols per slot, which are used in an OFDM system. The aforementioned values may be provided to a UE through the higher layer parameters, DL-BWP-mu and DL-BWP-cp, for the downlink, and through the higher layer parameter, UL-BWP-mu and UL-BWP-cp, for the uplink.

In the above Table 1, if μ=2 and SCS=60 kHz, a normal CP and an extended CP may be applied. In other bands, only the normal CP may be applied.

Here, a normal slot may be defined as a basic time unit used to transmit a single piece of data and control information in the NR system. A length of the normal slot may basically include 14 OFDM symbols. Also, dissimilar to a slot, a subframe may have an absolute time length corresponding to 1 ms in the NR system and may be used as a reference time for the length of another time section. Here, for the coexistence and the backward compatibility of the LTE and the NR system, a time section, such as an LTE subframe, may be required for an NR standard.

For example, in the LTE, data may be transmitted based on a transmission time interval (TTI) that is a unit time. The TTI may include at least one subframe unit. Here, even in the LTE, a single subframe may be set to 1 ms and may include 14 OFDM symbols (or 12 OFDM symbols).

Also, in the NR system, a non-slot may be defined. The non-slot may refer to a slot having the number of symbols less by at least one symbol than that of the normal slot. For example, in the case of providing a low latency such as an Ultra-Reliable and Low Latency Communications (URLLC) service, the latency may decrease through the non-slot having the number of slots less than that of the normal slot. Here, the number of the OFDM symbols included in the non-slot may be determined based on a frequency range. For example, a non-slot with 1 OFDM symbol length may be considered in the frequency range of 6 GHz or more. As another example, the number of symbols used to define the non-slot may include at least two OFDM symbols. Here, the range of the number of OFDM symbols included in the non-slot may be configured with the length of a mini slot up to (normal slot length)−1. Here, although the number of OFDM symbols may be limited to 2, 4, or 7, as a non-slot standard, it is provided as an example only.

Also, for example, an SCS corresponding to μ=1 and 2 may be used in the unlicensed band of 6 GHz or less and an SCS corresponding to μ=3 and 4 may be used in the unlicensed band above 6 GHZ. Here, for example, if μ=4, it may be used for a synchronization signal block (SSB).

TABLE 2

| μ | $N_{symb}^{slot}$ | $N_{slot}^{frame,\mu}$ | N_slot^(frame, μ) |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows a number of OFDM symbols per slot $$(N_{symb}^{slot}),$$

a number pf slots per frame $$(N_{slot}^{frame,\mu}),$$

and a number of slots per subframe $$(N_{slot}^{frame,\mu})$$

for the normal CP by the subcarrier spacing setting. In Table 2, the values are based on the normal slot having 14 OFDM symbols.

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

In Table 3, in the case of the extended CP applied (that is, μ=2 and SCS=60 kHz), it shows the number of slots per frame and the number of slots per subframe based on the normal slot for which the number of OFDM symbols per slot is 12.

As described above, a single subframe may correspond to 1 ms on a time axis. Also, a single slot may correspond to 14 symbols on the time axis. For example, a single slot may correspond to 7 symbols on the time axis. Therefore, the number of slots and the number of symbols that may be considered may be differently set within 10 ms corresponding to a single radio frame. Table 4 may show the number of slots and the number of symbols according to each SCS. Although the SCS of 480 kHz may not be considered in Table 4, the present disclosure is not limited to such examples.

TABLE 4

| SCS | slots in 10 ms | slots in 10 ms | symbols in 10 ms |
|---|---|---|---|
| 15 kHz | 10 | 20 | 140 |
| 30 kHz | 20 | 40 | 280 |
| 60 kHz | 40 | 80 | 560 |
| 120 kHz | 80 | N/A | 1120 |
| 240 kHz | 160 | N/A | 2240 |
| 480 kHz | 320 | N/A | 4480 |

The V2X service may support a set of basic requirements for V2X services. The requirements are designed basically in sufficient consideration of a road safety service. Here, the V2X UE may exchange autonomous status information through a SL. Also, the V2X UE may exchange the information with infrastructure nodes and/or pedestrians.

The V2X service (e.g., LTE Rel-15) may support at least one of a carrier aggregation in a SL, a high order modulation, a latency reduction, a transmit (Tx) diversity, and a sTTI (Transmission Time Interval). For this purpose, new features may be applied to the V2X communication. More particularly, the V2X UE may operate in consideration of coexistence with other V2X UEs. For example, the V2X UE may use the same resource pool as other V2X UEs.

For example, the technical features may be classified largely based on four categories as represented by the following Table 5 by considering the use cases for supporting a V2X service as the system aspect (SA) 1, but are not limited thereto. In Table 5, the "Vehicles Platooning" may be the technology that enables a plurality of vehicles to dynamically form a group and similarly operate. The "Extended Sensors" may be the technology that enables an exchange of data gathered from sensors or video images. The "Advanced Driving" may be the technology that enables a vehicle to drive based on semi-automation or full-automation. The "Remote Driving" may be the technology for remotely controlling a vehicle and the technology for providing an application. Based thereon, further description related thereto may be given by the following Table 5.

TABLE 5

Vehicles Platooning

Vehicles Platooning enables the vehicles to dynamically form a platoon travelling together. All the vehicles in the platoon obtain information from the leading vehicle to manage this platoon. This information allows the vehicles to drive closer than normal in a coordinated manner, going in the same direction and travelling together.

TABLE 5-continued

Extended Sensor

Extended Sensor enables the exchange of raw or processed data gathered through the local sensors or live video images among vehicles, road site units, devices of pedestrian and V2X application servers. The vehicles can increase the perception of their environment beyond what their own sensors can detect and have a more broad and holistic view of the local situation. The high data rate is one of the key characteristics.

Advanced Driving

Advanced Driving enables semi-automated or full-automated driving. Each vehicle and/or RSU shares its own perception data obtained from its local sensors with the vehicles in proximity and that allows the vehicles to synchronize and coordinate their trajectories or maneuvers. Each vehicle shares its driving intention with the vehicles in proximity too.

Remote Driving

Remote Driving enables a remote driver or a V2X application to operate a remote vehicle for those passengers who cannot drive by themselves or remote vehicles located in dangerous environments. For a case where the variation is limited and the routes are predictable, such as public transportation, driving based on cloud computing can be used. High reliability and low latency are the main requirements.

Also, the SA1 may support the case of operating in various systems (e.g., LTE and NR) as enhanced V2X (eV2X) support technology for supporting the V2X service. For example, an NR V2X system may be a first V2X system. Also, an LTE V2X system may be a second V2X system. That is, the NR V2X system and the LTE V2X system may be different V2X systems.

The following describes a method for satisfying low latency and high reliability required in an NR SL based on the NR V2X system. However, the same or similar composition may be expanded and applied to the LTE V2X system, and is included but not limited to the following examples. That is, in the LTE V2X system, the present disclosure may apply to an interactable portion.

Here, NR V2X capability may not be limited to essentially supporting only V2X services and V2X RAT to be used may be selected.

Also, new service requirements for Public Safety and commercial use case for NR V2X services may be considered further in. For example, the use case may include, but is not limited to, at least one of more advanced V2X services, public safety services, the Network Controlled Interactive Service (NCIS), the Gap Analysis for Railways (MONASTERYEND), the Enhanced Relays for Energy Efficiency and Extensive Coverage (REFEC), and the Audio-Visual Service Production (AVPROD) certification.

A physical channel, a signal, a basic slot structure, and a physical resource may be configured for the NR V2X. Here, an NR Physical SL Shared Channel (NR PSSCH) may be a physical layer NR SL data channel. The V2X UEs may exchange data and control information (e.g., 2nd SCI, CSI) through the NR PSSCH. An NR Physical SL Control Channel (NR PSCCH) may be a physical layer NR SL control channel. The NR PSCCH refers to a channel for transmitting scheduling information of the NR SL data channel and control information (1st SL Control Information (SCI)) including 2nd SCI indication. That is, a V2X UE may transmit control information for SL data communication to another V2X UE through PSCCH. An NR Physical SL Feedback Channel (NR PSFCH) refers to a channel for transmitting physical layer NR Hybrid Automatic Repeat Request (HARQ) feedback information and a channel for transmitting HARQ-ACK feedback information corresponding to the NR SL data channel (i.e., PSSCH). The V2X UE may transmit data to another V2X UE and then may receive the HARQ feedback information of the corresponding data through NR PSFCH. An NR SL Synchronization Signal/Physical SL Broadcast Channel (SLSS/PSBCH) block refers to a channel block in which an NR SL synchronization signal and a broadcast channel are transmitted in a single consecutive time. Here, the SLSS/PSBCH block may be periodically transmitted based on a set of one or more block indexes to support beam-based transmission in an NR frequency band. The synchronization signal includes a Primary SL Synchronization Signal (PSSS) and a Secondary SL Synchronization Signal (SSSS). The synchronization signal is generated based on at least one SLSSID value. The NR Physical SL Broadcast Channel (PSBCH) refers to a channel for transmitting system information required to perform V2X SL communication. The NR PSBCH is transmitted with the SLSS and periodically transmitted based on a set of SLSS/PSBCH block indexes to support beam-based transmission.

Also, a PSCCH and PSSCH may be defined for supporting NR V2X. A UE may transmit SCI to another UE via PSCCH. Here, the Tx UE may transmit the first SCI ($1^{st}$ SCI, SCI format 1-A) to the Rx UE via PSCCH. The $1^{st}$ SCI may be used for scheduling the PSSCH and the secondary SCI (2nd SCI) within the PSSCH, and the $1^{st}$ SCI may contain priority information, time/frequency resource allocation information, resource reservation information, Demodulation Reference Signal (DMRS) pattern information, 2nd SCI format indicator information, 2nd beta-offset indicator information as a parameter for the SCI and PSSCH rate matching operation, DMRS port count information, Modulation Coding Scheme (MCS) information, additional MCS table indicator information (e.g. indicating one of the 64 QAM, or 256 OAM or URLLC MCS table), PSFCH overhead indicator information (a parameter for PSSCH rate matching operation with $2^{nd}$ SCI), and at least one of the reserved bits.

Here, for example, the $2^{nd}$ SCI format indicator information may be as shown in Table 6 below. Specifically, if the $2^{nd}$ SCI format indicator information is a two-bit value of "00", it may indicate SCI format 2-A. Also, the $2^{nd}$ SCI format indicator information may indicate SCI format 2-B if the value is "01", and the remaining values may be reserved bits. However, Table 6 is only one example, and the $2^{nd}$ SCI format indicator information is not limited to the above example.

TABLE 6

| Value of 2nd-stage SCI format field | 2nd-stage SCI format |
| --- | --- |
| 00 | SCI format 2-A |
| 01 | SCI format 2-B |
| 10 | Reserved |
| 11 | Reserved |

Also, the Beta-offset indicator information as a parameter for the PSSCH rate matching operation with $2^{nd}$ SCI may be as shown in Table 7 below. The Beta-offset indicator information may be two bits of information indicating the respective indexes provided by the higher layer parameter "sl-BetaOffsets2ndSCI". However, Table 7 is an example, and the Beta-offset indicator information is not limited to the example described above.

TABLE 7

| Value of Beta-offset Indicator | Beta_offset index in Table 9.3-2 of [5, TS38.213] |
| --- | --- |
| 00 | 1st index provided by higher layer parameter sl-BetaOffsets2ndSCK |
| 01 | 2nd index provided by higher layer parameter sl-BetaOffsets2ndSCK |
| 10 | 3rd index provided by higher layer parameter sl-BetaOffsets2ndSCK |
| 11 | 4th index provided by higher layer parameter sl-BetaOffsets2ndSCK |

Also, for example, the number of DMRS port information may be as shown in Table 8 below. The number of DMRS port information is one-bit information, and if a value of the number of DMRS port information is "0", it may indicate that the antenna port 1000 is used as one antenna port. Also, if a value of the number of DMRS port information is "1", it may indicate that the antenna port 1000 and 1001 are used as the two antenna ports. However, Table 8 is only one example, and the number of DMRS port information is not limited to the above examples.

TABLE 8

| Value of the Number of DMRS port field | Antenna ports |
| --- | --- |
| 0 | 1000 |
| 1 | 1000 and 1001 |

Also, the $2^{nd}$ SCI may be used to provide source ID, destination ID information, PSSCH decryption, and option information related to the feedback transmission. Here, if the $2^{nd}$ SCI is SCI format 2-A, the $2^{nd}$ SCI may be the format for the HARQ ACK/NACK feedback option, and if the $2^{nd}$ SCI is SCI format 2-B, the $2^{nd}$ SCI may be the format for HARQ NACK only feedback option. In the case of SCI format 2-A, the $2^{nd}$ SCI may include at least one of HARQ process number information, New Data Indicator (NDI) information, Redundancy Version (RV) information, source ID information, destination ID information, HARQ feedback enable/disable indicator information, cast type indicator information, and CSI request information.

For example, the cast type indicator information may be as shown in Table 9 below. Here, the cast type indicator information may have a two-bit value, and each value may indicate a broadcast type, a unicast type, and a groupcast type. Here, the groupcast may have two types: one that includes an ACK or a NACK in the HARQ-ACK information, and another that only includes a NACK in the HARQ-ACK information. The cast type indicator information may indicate each of these types. That is, the cast type information may indicate a broadcast type, a unicast type, a groupcast type that includes an ACK/NACK in the HARQ-ACK information, and a groupcast type that includes only a NACK in the HARQ-ACK information. However, Table 9 is only one example, and the cast type information is included but not limited to the above-described example.

TABLE 9

| Value of Cast type indicator | Cast Type |
| --- | --- |
| 00 | Broadcast |
| 01 | Groupcast when HARQ-ACK information includes ACK or NACK |

TABLE 9-continued

| Value of Cast type indicator | Cast Type |
| --- | --- |
| 10 | Unicast |
| 11 | Groupcast when HARQ-ACK information includes only NACK |
| 00 | Broadcast |

Further, in the case of SCI format 2-B, the $2^{nd}$ SCI may include at least one of HARQ process number information, New Data Indicator (NDI) information, Redundancy Version (RV) information, source ID information, destination ID information, HARQ feedback enable/disable indicator information, zone ID information, and communication range requirement information. The Rx UE may receive the above-described SL control information from the Tx UE to perform data transmission and reception. Here, the HARQ-ACK feedback for the SL data transmission may be transmitted via the PSFCH, i.e., the PSFCH may be present as a channel for the HARQ feedback. On the other hand, Channel Status Information (CSI), which is the channel status information for the sidelink, may be transmitted over the PSSCH, i.e., the channel status information may be transmitted over the data channel.

Here, in one example, the communication range requirement information may comprise four bits, each value indicating a specific range in meters. In one example, the communication rage requirement information may specify {20, 50, 80, 100, 120, 150, 180, 200, 220, 250, 270, 300, 320, 350, 370, 400, 420, 450, 480, 500, 550, 600, 700, 1000, Spare, Spare, Spare, Spare, Spare, Spare, Spare, Spare}; however, this is only one example and the communication.

Figure 3:
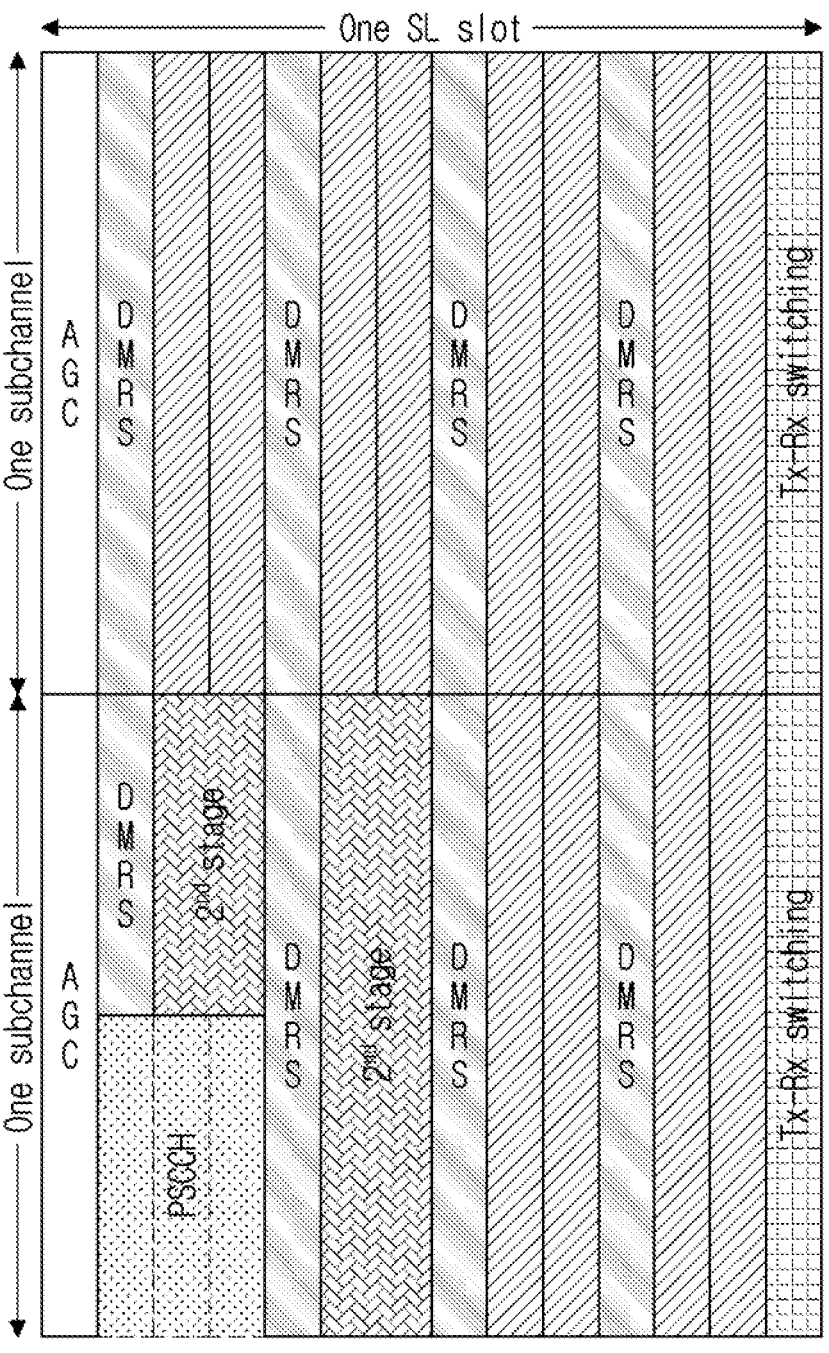
FIG. 3 illustrates an NR SL slot structure to which the present disclosure may apply.

FIG. 3 illustrates an NR SL slot structure to which the present disclosure may apply.

Referring to FIG. 3, a single SL slot (SL slot) includes a single automatic gain control (AGC) symbol. Also, a single SL slot includes a single Tx-Rx switching symbol. In a single SL slot, the PSSCH that is a channel through which data is transmitted is transmitted through at least one sub-channel (e.g., two subchannels in FIG. 3). Also, in a time domain, PSCCH ($1^{st}$ SCI), $2^{nd}$ SCI, PSSCH (Data), and demodulation RS (DMRS) for demodulation may be transmitted to the remaining OFDM symbols excluding the AGC symbol and the Tx-Rx switching symbol. In detail, locations of the PSCCH ($1^{st}$ SCI), the $2^{nd}$ SCI, the PSSCH (Data), and the DMRS for demodulation may be the same as in FIG. 3, but are not limited thereto. For example, in FIG. 3, the PSCCH and the $2^{nd}$ SCI are present in the first subchannel and the PSSCH and the DMRS may be allocated considering this. As another example, the second subchannel refers to a subchannel in which the PSCCH and the $2^{nd}$ SCI are absent and the PSSCH and the DMRS may be allocated as in FIG. 3.

Here, the number of PSSCH DMRSs may be configured according to a higher layer configuration and one or more PSSCH DMRSs may be configured according to a channel environment of the UE. A PSCCH ($1^{st}$ SCI) receives a demodulation using a DMRS of PSCCH (i.e., PSCCH DMRS) and is equally allocated and transmitted to every four resource elements (REs) within a single resource block (RB). On the contrary, the $2^{nd}$ SCI is decoded using the PSSCH DMRS.

Also, for example, a single resource pool associated with an NR SL may support the frequency division multiplexing (FDM), the time division multiplexing (TDM), and the spatial divisional multiplexing (SDM). This means that each resource in a single resource pool can be divided and used based on the frequency, the time, and the space, which can increase the resource efficiency.

Figure 4:
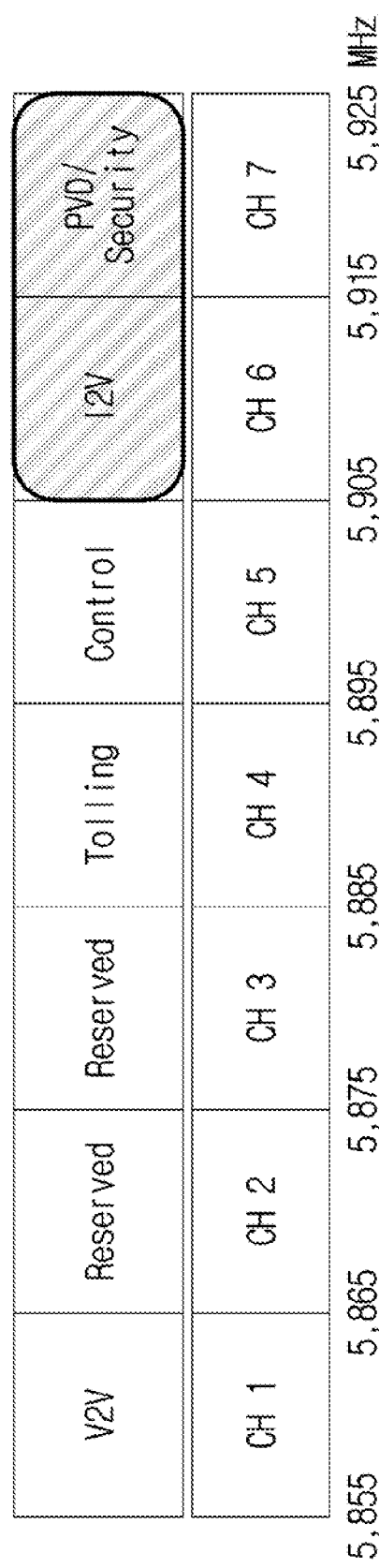
FIG. 4 illustrates an NR SL frequency to which the present disclosure may apply.

FIG. 4 illustrates an NR SL frequency to which the present disclosure may apply. For example, the NR SL may operate based on at least one of Frequency Range 1 (FR1)

TABLE 10

| Delay: [3, 100 ms] |
| Reliability: [90%, 99.999%] |
| Data rate: up to 1 Gbps (TS22.186) |

TABLE 11

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 1 | GBR (NOTE 1) | 3 | 20 ms | $10^{-4}$ | N/A | 2000 ms | Platooning between UEs-Higher degree of automation; Platooning between UE and RSU-Higher degree of automation |
| 2 | | 4 | 50 ms | $10^{-2}$ | N/A | 2000 ms | Sensor sharing-higher degree of automation |
| 3 | | 3 | 100 ms | $10^{-4}$ | N/A | 2000 ms | Information sharing for automated driving-between UEs or UE and RSU-higher degree of automation |
| 55 | Non-GBR | 3 | 10 ms | $10^{-4}$ | N/A | N/A | Cooperative lane change-higher degree of automation |
| 56 | | 6 | 20 ms | $10^{-1}$ | N/A | N/A | Platooning informative exchange-low degree of automation; Platooning-information sharing with RSU |
| 57 | | 5 | 25 ms | $10^{-1}$ | N/A | N/A | Cooperative lane change-lower degree of automation |
| 58 | | 4 | 100 ms | $10^{-2}$ | N/A | N/A | Sensor information sharing-lower degree to an RSU |
| 59 | | 6 | 500 ms | $10^{-1}$ | N/A | N/A | Platooning-reporting to an RSU |
| 82 | Delay Critical GBR (NOTE 1) | 3 | 10 ms | $10^{-4}$ | 2000 bytes | 2000 ms | Cooperative collision avoidance; Sensor sharing-Higher degree of automation; Video sharing-higher degree of automation |
| 83 | | 2 | 3 ms | $10^{-5}$ | 2000 bytes | 2000 ms | Emergency trajectory alignment; Sensor sharing-Higher degree of automation |

NOTE 1:
GBR and Delay Critical GBR PQIs can only be used for unicast PC5 communications.
Editor's note: It is FFS if GBR and Delay Critical GBR can also be used for broadcast and groupcast.
NOTE 1:
For standardized PQI to QoS characteristics mapping, the table will be extended/updated to support service requirements for other identified V2X services.
NOTE 2:
The PQIs may be used for other services than V2X.

(sub 6 GHZ) and Frequency Range 2 (FR2) (i.e., up to 52.6 GHZ), the unlicensed ITS bands, and the licensed band.

In detail, for example, referring to FIG. 4, 5,855 to 5,925 MHz may be allocated for an ITS service (technology neutral manner).

Also, the NR V2X quality of service (QoS) requirements may be considered. That is, the delay, the reliability, and a data rate may need to be satisfied with predetermined conditions related to the requirements for an NR V2X service. Here, the requirements may be configured as in Table 10 below and Table 11 may show the PC5 QoS for the NR V2X.

Here, to satisfy the QoS requirements, the access stratum (AS) level QoS management may be required. To this end, a HARQ and CSI feedback associated with a link adaptation may be required. Also, each of the NR V2X UEs may have a different maximum bandwidth capability (max. BW capability). Considering this, AS level information that includes at least one of a UE capability, QoS related information, a radio bearer configuration, and a physical layer configuration may be exchanged between the NR V2X UEs.

Hereinafter, a SL HARQ procedure is described. Whether the V2X UE is to report a HARQ feedback is indicated by a higher layer (e.g., RRC) configuration and SCI signaling (e.g., $2^{nd}$ SCI). For example, if the V2X UE performs SL communication based on a groupcast, whether to report the HARQ feedback may be determined based on a distance between a Tx UE and a Rx UE.

When the V2X UE performs at least one of unicast and groupcast transmissions, the SL HARQ feedback may be enabled or disabled. Here, enabling/disabling the HARQ feedback may be determined based on at least one of a channel condition (e.g., RSRP), a distance between Tx UE and Rx UE, and QoS requirements.

In the case of groupcast, whether to transmit a HARQ feedback may be determined based on a physical distance between the Tx UE and the Rx UE. Here, when the HARQ feedback is performed for the groupcast transmission via a PSSCH, the Rx UE may send a negative response only when the received PSSCH decoding fails. It may be called an option 1 operation. Moreover, when the HARQ feedback is performed for the groupcast transmission via a PSSCH, the Rx UE may send a positive response or a negative response based on whether a PSSCH decoding succeeds and it may be called an option 2 operation. In the option 1 operation of feeding back only a negative response as a NACK only HARQ feedback, if the physical distance between the Tx UE and the Rx UE is less than or equal to the communication range requirements, a HARQ feedback corresponding to the PSSCH reception may be performed. On the contrary, if the physical distance between the Tx UE and the Rx UE is greater than the communication range requirements, the V2X UE may not perform the HARQ feedback corresponding to the PSSCH reception.

Here, a location of the Tx UE is indicated to the Rx UE through SCI signaling associated with the PSSCH. The Rx UE may estimate a distance from the Tx UE based on both pieces of information included in the received SCI and its location information and may operate as above.

Also, when a unicast communication is performed based on the V2X, a case in which an SL HARQ feedback is enabled may be considered. The Rx UE may generate and transmit a HARQ ACK/NACK corresponding to the PSSCH depending on whether the decoding of a corresponding transport block (TB) succeeds.

Then, an NR SL resource allocation mode refers to a mode in which a base station schedules a SL transmission resource. Here, a mode in which the base station schedules a SL transmission resource may be mode 1. For example, when the V2X UE is located within the base station coverage, the V2X UE may receive SL resource information from the base station. On the contrary, there is a mode in which the V2X UE directly determines a resource for SL transmission on either a SL resource configured by the base station/network or a pre-configured SL resource. Here, a mode in which the UE directly determines a SL transmission resource may be mode 2.

Also, a SL received signal strength indicator (SL RSSI) is defined as an average value (in [W]) of the total received power measured from subchannels configured within the OFDM symbols of a slot configured for the PSCCH and the PSSCH.

Also, the V2X UE may measure a SL Channel busy ratio (SL CBR) in slot n. Here, the CBR measurement is performed within the CBR measurement window ([n−a, n−1]). The CBR measurement window is configured based on a higher layer parameter value "time WindowSize-CBR" and the above a value has one value of 100 or 100.24 slots. The CBR measurement refers to a value used to define a ratio of subchannels having an SL-RSSI value exceeding a predetermined threshold among subchannels in the entire resource pool.

Figure 5:
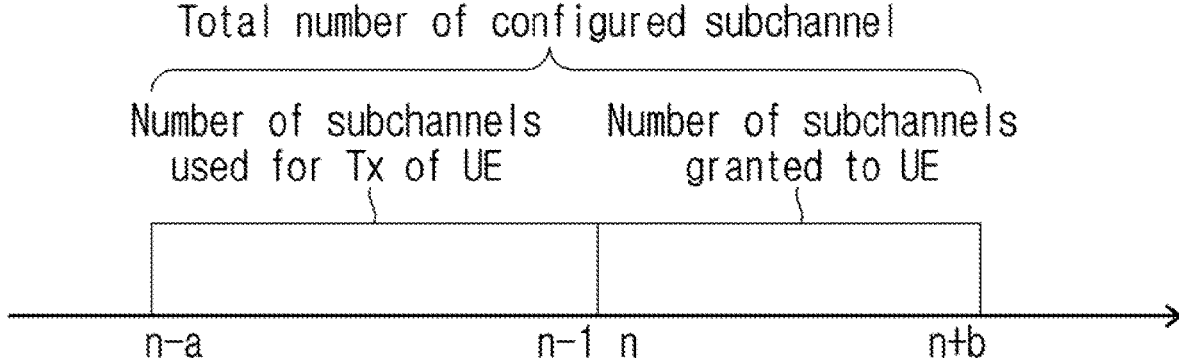
FIG. 5 illustrates a method for measuring a Channel Busy Ratio (CBR) to which the present disclosure may apply.

For example, FIG. 5 illustrates a method of measuring a SL Channel occupancy Ratio (CR) to which the present disclosure may apply.

Referring to FIG. 5, the V2X may measure a CR in slot n. Here, slots up to [n−a, n+b] are the slots allowed for the V2X UE and slots [n−a, n−1] are the slots used by the V2X UE for an SL transmission. In slot n, a CR value may be a value acquired by dividing the total number of subchannels in [n−a, n−1] and the total number of subchannels in [n, n+b] by the total number of subchannels configured in a transmission resource pool corresponding to the time [n−a, n+b].

In detail, a has a positive value at all times in the time section (slots [n−a, n−1]) used for an SL transmission. On the contrary, b within the time (slots [n, n+b]) for counting the number of subchannels of a resource allowed for the UE has a value of 0 or a positive value. The values of a and b are determined to satisfy all the conditions of a+b+1=1000 or 1000.24 slots and b< (a+b+1)/2 by a UE implementation.

As another example, the values of a and b are set to use one value of 1000 or 1000-24 slots by higher layer parameter "time WindowSize-CR". Also, a value of n+b should not exceed a last transmission occasion of a grant for the current transmission. Here, a slot for the CBR and the CR may be a physical slot and the CBR and the CR may be measured every time the transmission is performed.

Also, for example, the Discontinuous Reception (DRX) operation of the UE may be considered. The DRX operation is an operation where a UE performs a discontinuous reception over a period of time to reduce power consumption. The UE may monitor for paging messages only in a paging occasion based on the paging DRX cycles in the Radio Resource Control (RRC) off state. The UE may also reduce power consumption by performing a PDCCH monitoring in the on-duration based on the DRX operation in the RRC connected state.

Figure 6:
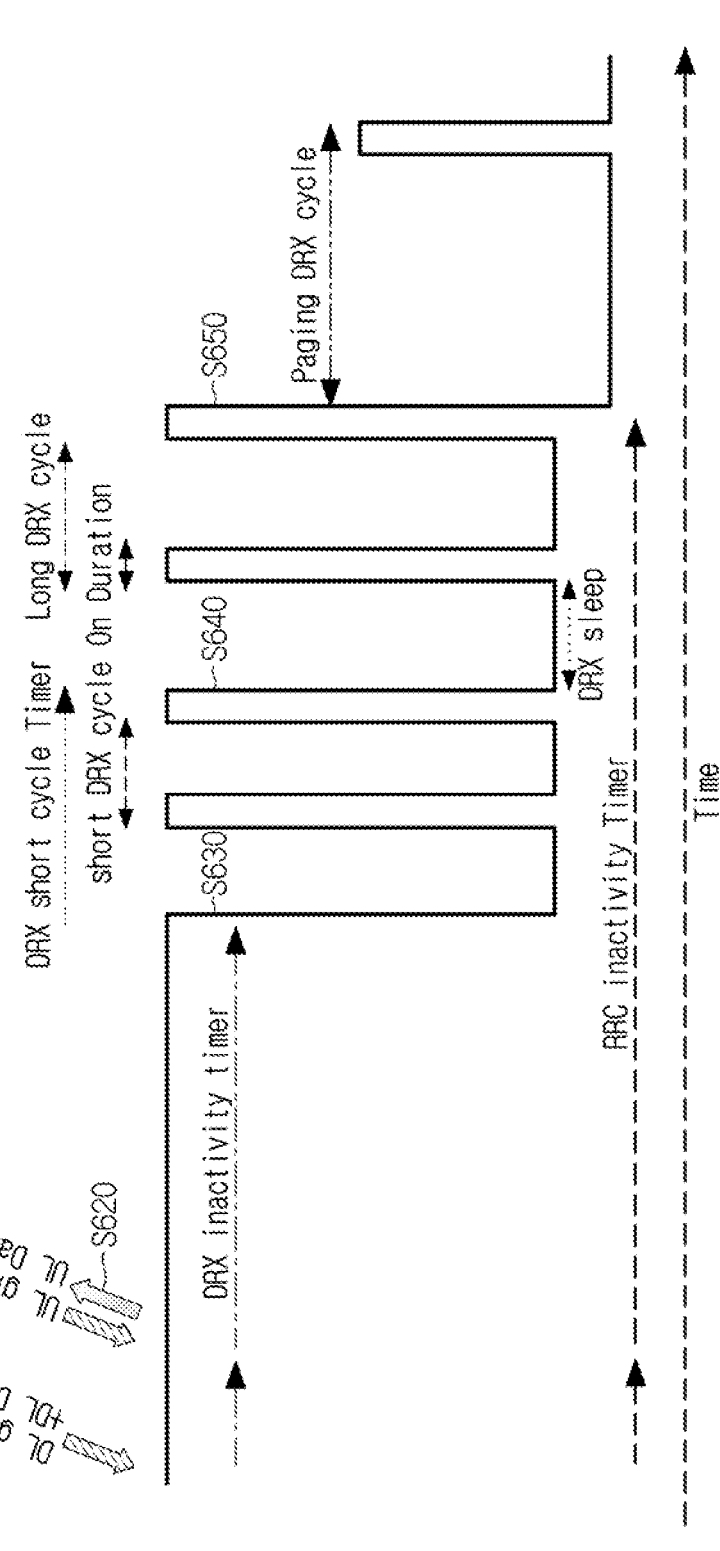
FIG. 6 illustrates a DRX operation to which the present disclosure may apply.

More specifically, referring to FIG. 6, the UE may monitor the PDCCH in the RRC connection state and receive a downlink grant and DL data (S610). Here, when the UE receives the DL grant and the DL data, the DRX inactivity timer and the default RRC inactivity timer may be (re) started. That is, the DRX inactivity timer may be used to prevent the UE from transitioning to the DRX state to reserve a certain period at the time the UE receives the DL data. Additionally, the RRC inactivity timer may be started at the time the UE receives the DL data to prevent the UE from entering the RRC IDLE state to reserve a period of time.

When the UE receives a UL grant, the DRX inactivity timer and the RRC inactivity timer may be (re) started, and the UE may transmit UL data. (620) When the UE receives the UL grant and transmits the UL data, the DRX inactivity timer may be started to prevent the UE from switching to the DRX state to guarantee the contiguous data transmission and reception during a certain period of time. Also, when the UE receives the UL grant and transmits the UL data an RRC inactivity timer may be started to prevent the UE from switching to the RRC IDLE state to secure a certain period of time.

That is, the UE may (re) start the DRX inactivity timer and the RRC inactivity timer if a grant for data reception and transmission occurs. Here, if the DRX inactivity timer is executed, the UE may continuously perform the PDCCH monitoring. After the DRX inactivity timer and the RRC inactivity timer are started, if no DL grant or UL grant has occurred in the UE until the timer expires, a short DRX cycle may be started, if a short DRX cycle is configured for the UE. (S630) Further, for example, the short DRX cycle may be started if the UE receives a DRX command and a short DRX cycle is set for the UE. Here, the DRX command may be received via a DRX Command MAC CE, wherein the DRX command MAC CE may be identified via an LCID in the MAC PDU subheader. For example, the short DRX cycle may be motivated mainly by the Voice over Internet Protocol (VOIP) service, but may not be limited thereto.

That is, if the UE receives the DRX Command MAC CE, the on-duration timer and the DRX inactivity timer is suspended, and if a short DRX cycle is configured for the UE, the short DRX cycle timer is started on the set short DRX cycle. On the other hand, if the short DRX cycle is not configured, a long DRX cycle based on the long DRX cycle timer is started. Here, the short DRX cycle timer may be started (or restarted) on the first symbol after the reception of a DRX MAC Command MAC CE or on the first symbol after the DRX inactivity timer expires. If a short DRX cycle is started, the UE may not monitor the PDCCH during the DRX sleep period, but may perform the PDCCH monitoring only during the on-duration interval, thereby reducing the power consumption. Here, the DRX inactivity timer and the RRC inactivity timer may be restarted if the UE identifies the reception of either the DL grant or the UL grant through the PDCCH monitoring. On the other hand, if no DL grant or UL grant occurs until the short DRX cycle timer expires, the UE may stop the short DRX cycle and then, start the long DRX cycle. (S640) For another example, if the UE receives the Long DRX Command MAC CE, the on-duration timer and the DRX inactivity timer may be stopped and the long DRX cycle may be started.

Further, for example, each of the short DRX cycle and the long DRX cycle may have a cycle and a DRX start offset (drxStartOffset) value, respectively. Here, a start subframe of the on-duration may be determined based on the DRX start offset from the start of the cycle. A DRX on-duration timer (drx-onDurationTimer) may be started based on the start of the on-duration.

The UE may perform the PDCCH monitoring during the on-duration interval while monitoring the PDCCH is not performed during the DRX sleep interval within the long DRX cycle. Here, the RRC inactivity timer may be expired if the UE has not received a DL grant or UL grant after the start of the RRC inactivity timer before the RRC inactivity timer expires. In case the RRC inactivity timer expires, the UE may enter the RRC IDLE state. (S650) At this time, in the RRC IDLE state, the UE may operate based on a paging DRX cycle.

Figure 7:
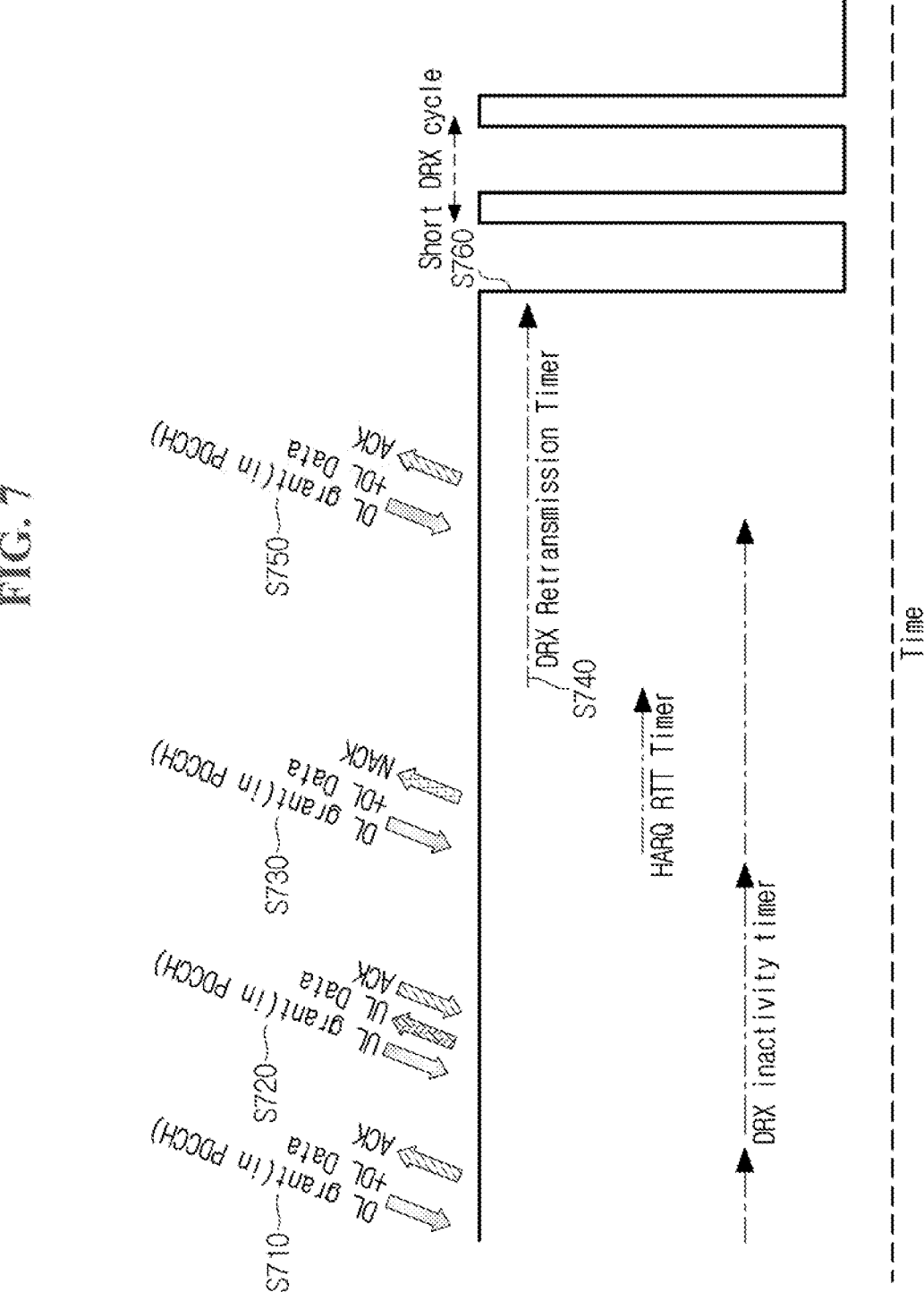
FIG. 7 illustrates a DRX operation to which the present disclosure may apply.

Also, for example, referring to FIG. 7, the UE may perform a DRX operation considering the hybrid automatic repeat request (HARQ) feedback. In detail, the UE in the RRC connection state may receive a DL grant and DL data by performing a PDCCH monitoring. (S710) Here, the UE may (re) start the DRX inactivity timer and the RRC inactivity timer. Here, after receiving the DL data, the UE may transmit ACK/NACK information to the base station indicating whether the DL data is successfully received or not. For example, the UE may complete the data reception by successfully receiving the DL data and transmitting an ACK to the base station.

Also, the UE may receive the UL grant and then, transmit the UL data to the base station based on the received UL grant. At this time, the DRX inactivity timer and the RRC inactivity timer may be (re) started. (S720) Thereafter, the base station may transmit ACK/NACK information to the UE indicating whether the UL data transmission is successful or not. For example, the base station may complete the data transmission by successfully receiving the UL data and transmitting an ACK to the UE.

A case in which the UE receives the DL grant but fails to successfully receive the data scheduled by the DL grant due to a failure of decoding the DL data may be considered. In this case, the UE may transmit a NACK to the base station, and a data retransmission by a base station may be performed based on the NACK. (S730) Here, the HARQ round trip time timer (HARQ RTT Timer) may start at the first symbol after end of the DL HARQ feedback (NACK) transmission. After the NACK transmission by the UE, the HARQ RTT Timer may be defined for the time interval before the DL HARQ retransmission is performed. The UE may not monitor the PDCCH indicating a retransmission for the corresponding HARQ process while the HARQ RTT Timer is in operation, but may start a PDCCH monitoring for a reception of a retransmission when the HARQ RTT Timer expires. Also, the DRX retransmission timer may start at the first symbol immediately following the expiration of the HARQ RTT Timer. (S740) The UE may perform a PDCCH monitoring while the DRX retransmission timer is in running, and may receive a DL grant scheduling the retransmission. If the UE successfully decodes the DL data based on the DL grant, the UE may transmit an ACK to the base station. (S750) Here, the DL grant for the retransmission data may not restart the DRX inactivity timer described above, and the DRX inactivity timer may expire before the DRX retransmission timer expires. However, if the DRX retransmission timer is running, the UE may not enter the short DRX cycle. On the other hand, the UE may enter the short DRX cycle if the DRX retransmission timer expires. (S760)

Also, for example, if the UE has performed a UL data transmission (i.e., a MAC PDU has been transmitted), the drx-HARQ-RTT-TimerUL starts at the first symbol after the end of the first repetition of the corresponding PUSCH. After that timer expires, the UE may expect to receive a UL grant for retransmitting the PUSCH, in the same HARQ process, and may perform the retransmission based on the received UL grant.

Also, for example, the DRX cycle may be synchronized between the UE and the base station (e.g., gNB). That is, the base station may recognize that the UE is in a DRX sleep state or a DRX awake state and may schedule a data transmission for the UE accordingly.

Also, the UE may not perform a PDCCH monitoring in DRX sleep state, as described above. Since the base station may recognize the DRX cycle/state of the UE, the base station may delay the PDCCH transmission until the nearest wake up cycle. Also, for a UL transmission, the UE may send a Scheduling Request (SR) in the UL to the base station. For example, even if the UE is in a DRX sleep state, when UL data is generated in the UE, the UE may send an SR to the base station in order to receive the UL grant.

Also, for example, in addition to the aforementioned timer and parameters, the MAC layer within the base station (e.g., the gNB MAC) may control the DRX of the UE by transmitting MAC CE DRX commands (e.g., DRX Command MAC CE or Long DRX Command MAC CE), as aforementioned. Also, if the DRX is set in the UE, the same operation may be applied to the set DL/UL grant as when a MAC PDU is received/transmitted and a PDCCH is received in the active time, respectively.

Also, for example, the base station (e.g., gNB) may control the on-duration time interval through an RRC configuration of DRX or instruct to follow a long DRX cycle. As aforementioned, the base station may recognize that a DL data transmission may not exist for the UE, and it may prevent the UE from being activated so that the UE reduces the power consumption. Also, for example, if a DRX is set in the UE, the active time may include a time when at least one of "drx-onDurationTimer", "drx-InactivityTimer", "drx-RetransmissionTimerDL" and "drx-RetransmissionTimerUL" is operated. Also, the active time may include the time when the "ra-ContentionResolutionTime" is operated. Also, the active time may include a time after the SR is transmitted on a Physical Uplink Control Channel (PUCCH) and is pending. Also, the active time may include a time when the PDCCH for the new transmission indicated according to the Radio Network Temporary Identifier (C-RNTI) is not received after a successful reception of the RA for the RA preamble that is not selected by the MAC entity among the Contention Based Random Access preambles (CBRA).

As aforementioned, a DRX operation may be performed, and the parameters related to a DRX operation controlled by an RRC may be shown in Table 12 below.

TABLE 12 drx-onDurationTimer: the duration at the beginning of a DRX Cycle;
drx-SlotOffset: the delay before starting the drx-onDurationTimer;
drx-InactivityTimer: the duration after the PDCCH occasion in which a PDCCH indicates a new UL or DL transmission for the MAC entity;
drx-RetransmissionTimerDL (per DL HARQ process except for the broadcast process): the maximum duration until a DL retransmission is received;
drx-RetransmissionTimerUL (per UL HARQ process): the maximum duration until a grant for UL retransmission is received;
drx-LongCycleStartOffset: the Long DRX cycle and drx-StartOffset which defines the subframe where the Long and Short DRX Cycle starts;
drx-ShortCycle (optional): the Short DRX cycle;
drx-ShortCycleTimer (optional): the duration the UE shall follow the Short DRX cycle;
drx-HARQ-RTT-TimerDL (per DL HARQ process except for the broadcast process): the minimum duration before a DL assignment for a HARQ retransmission is expected by the MAC entity;
drx-HARQ-RTT-TimerUL (per UL HARQ process): the minimum duration before a UL HARQ retransmission grant is expected by the MAC entity.

Also, for example, in a new radio communication system (e.g., NR), a DRX operation for handling a plurality of SCS may be considered in consideration of the aforementioned Numerology. Also, the short DRX cycle may be selectively configured in consideration of a cyclic transmission traffic service of a short cycle such as the Voice of Internet Protocol (VOIP). Also, if the latest data is scheduled to the long DRX operation, a short DRX cycle is applied first for a certain period of time (e.g., 20 ms for VoIP packet (having per 20 ms traffic pattern)), and then a long DRX cycle may be used, but is not limited to the aforementioned example.

Also, for example, the unit of the DRX timer may be configured in ms units in consideration of the presence of a plurality of numerology in the new communication system (e.g. NR). However, this is only an example, and it may be possible for the DRX timer to be set based on another unit, and is not limited to the aforementioned example.

Also, for example, when performing a HARQ retransmission operation in an asynchronous HARQ, which is a method of allocating resources at a random time for retransmission, the base station may perform a retransmission to the transport block (TB) in which an error occurs. For example, the timer may correspond to the HARQ RTT Timer. Also, for example, the timer may be started when an error is confirmed in the TB, and is not limited to the aforementioned example.

However, for example, the following may be applied not only to a more advanced NR V2X service, but also to other services based on NR SLs (e.g., public safety, commercial use case (e.g., wearable)). In the following, for the convenience of explanation, it is described based on the more advanced NR V2X service and is not limited thereto. Here, the NR SL frequency for an NR SL operation may include at least one of the FR1 (410 MHZ~7.125 GHz), the FR2 (24.25 GHz~52.6 GHz) and a frequency band higher than 52.6 GHz. Also, the NR SL frequency for the NR SL operation may consider unlicensed ITS bands and licensed ITS bands that may exist in a frequency band lower than FR2 and all the frequency bands in which the NR system operates, and is not limited to a specific band.

The NR SL may be applied in consideration of the availability of a radio access interface (e.g. Uu link) between the base station and the UE in a 3GPP NG-RAN network (e.g. LTE (ng-eNB)/NR (gNB)). For example, the base station may provide the UE with related settings for transmitting and receiving an NR SL data, an NR SL physical resource allocation, an NR SL configuration (NR SL configuration, etc.), and other settings related to the NR SL, and the NR SL may consider it. In the following, for the convenience of description, the ng-eNB or gNB on the NG-RAN network is described as a base station. Also, the base station is not limited to the ng-eNB or gNB on the NG-RAN network and may be another form of wireless communication with the UE. However, in the following, it is described as a base station for the convenience of explanation.

Next, the UE may operate based on an NR SL DRX (hereinafter referred to as NR SL DRX) configuration. For example, an NR SL DRX configuration may be set in a UE performing an SL communication. That is, the DRX cycle and active time are configured/determined based on the NR SL DRX configuration between the UEs performing data transmission and reception via the SL, and the SL communication may be performed based thereon.

Also, the SL UEs may perform an NR SL HARQ feedback with consideration of the NR SL DRX configuration. Here, the cast type capable of an NR SL HARQ feedback may be at least one of unicast and groupcast. That is, the broadcast type may not require an NR SL HARQ feedback.

Also, a common DRX cycle (hereinafter referred to as COD) may be set to enable the minimal data transmission and reception between SL UEs in a resource pool in which the NR SL DRX configuration is set. For example, the COD setting may be independently configured per UEs (e.g., per UE, per direction (link)-specific or per peer UEs unicast/groupcast), per resource pool, per quality of service (QoS) class (PC5 QoS Identifier, PQI), per service type (e.g., PSID/ITS-AID) or per logical channel (LCH). Also, in addition to the COD that may be shared by all the SL UE, a separate NR SL DRX configuration may be additionally configured. Here, the additional NR SL DRX configuration may be configured independently for per some UEs (e.g., per UE, per direction (link)-specific or per peer UEs), per resource pool, per QoS class (PQI), per service type (e.g., PSID/ITS-AID) or per LCH.

That is, the common NR SL DRX configuration or the independent NR SL DRX configuration may be set based on at least one or a combination thereof of Table 13 below. Also, the NR SL DRX configurations shown in Table 13 may be configured in one or more numbers.

For example, the NR SL DRX configurations described below may be applied to at least one or more combinations thereof of Table 13 below and are not limited to a specific configuration. Also, the NR SL DRX cycle configuration may also be provided by one higher parameter included in the NR SL DRX configuration and is not limited to the aforementioned example.

TABLE 13

Per resource pool
Per QoS(PQI or PDB) or per LCH
Applied to handle different traffic patterns
Per all cast types
Per each unicast, groupcast session, or broadcast
e.g., In the case of a UE with a PC5 RRC Connection, the DRX pattern is aligned through PC5 RRC signaling, and the UEs that are not aligned are sorted through another method (e.g. SL, MAC CE)

TABLE 13-continued

| Per each device (PC5 unicast connection, source ID-Destination ID pair, or Source ID (Source Tx UE)) Per SL Grant (SL HARQ process) |
| --- |

That is, the NR SL DRX configuration may be configured based on one or more combinations of the setting methods of Table 13, and the NR SL DRX configuration of Table 13 may be applied in the following cases.

An NR SL DRX configuration may be provided by the base station for the SL UE. For another example, the NR SL DRX configuration may be pre-configured for the SL UE. For another example, the NR SL DRX configuration may be configured based on a Tx centric in which the Tx UE provides an NR SL DRX configuration to the Rx UE. For another example, the NR SL DRX configuration may be configured based on the Rx centric that the Rx UE determines the NR SL DRX configuration and send to the Tx UE. For another example, the NR SL DRX configuration may be configured through negotiation between the UEs. In detail, if there is a unicast session connection between the UEs, the NR SL DRX configuration may be determined through a negotiation between the Tx UE and the Rx UE, through which the Tx UE and the Rx UE may perform an NR SL DRX operation based on the same value.

That is, the NR SL DRX configuration may be configured in various ways, and is not limited in a specific way. For an example, Table 14 may be signaling options for configuring the NR SL DRX, wherein the NR SL DRX configuration may be indicated.

TABLE 14

| Signaling options for the SL DRX configurations Dedicated RRC signaling for the RRC Connected mode SIB for the RRC idle/inactive mode Pre-configuration signaling for the OOC Provided by the higher layer (e.g. V2X layer) PC5 RRC signaling |
| --- |

If the NR SL DRX configuration is set in the UE, the UE may decide whether to report the PC5 DRX parameter to the base station. The UEs performing an SL communication may determine who sets the DRX pattern first, and may determine whether to report the information to the base station. As described above, since the base station may provide various configuration information related to the SL to the UE, there is a need for the NR SL DRX configuration to be reported to the base station. In consideration of the above, the UE may determine whether to report the PC5 DRX parameter to the base station.

Also, for example, the SL DRX active time may include a time to monitor the 1st SL Control Information (SCI) transmitted through a Physical SL Control Channel (PSCCH). Also, the SL DRX active time may additionally include a time to monitor the 2nd SCI (PSSCH) transmitted through the Physical SL Shared Channel (PSSCH).

For another example, the active time may include a periodically reserved resource or a time domain resource allocation for each transport block (TB). For another example, the SL active time may include a time when an SL HARQ feedback corresponding to a PSSCH reception is transmitted through a Physical SL Feedback Channel (PSFCH). For another example, the active time may include a time for receiving the SL HARQ feedback corresponding to the PSSCH transmission through the PSFCH. That is, the SL active time may include a time when active of the UE is required for the SL transmission, and is not limited to the aforementioned example.

For a specific example, the UE may be configured to perform an SL transmission only at the active time and not to perform an SL transmission at the inactive time. Also, for example, an SL transmission may be possible at both an active time and an inactive time.

If an SL transmission is possible only at the active time, the UE performs a transmission only at the active time, so that the power consumption may be reduced, but the congestion level may be increased, and there may be a limit to efficient resource utilization. On the other hand, if an SL transmission is possible at both the active time and the inactive time, the power consumption of the UE may increase. Therefore, in consideration of the UE situation, it is possible to set whether an SL transmission is possible only at the active time or at both the active time and the active time.

Also, for example, an NR SL DRX time unit may be defined as an absolute physical time unit (i.e., ms). For another example, the NR SL DRX time unit may be defined as a constant time value based on a logical slot. That is, the NR SL DRX time unit can be defined based on a logical slot without affecting the TDD UL-DL setting. That is, the NR SL DRX time unit can be defined based on a logical slot without affecting the TDD UL-DL setting. The NR SL DRX-related timer and time unit may be set based on the logical slot, and the time based on the following logical slot may be converted to the absolute time based on the following Equation 3.

In Equation 3, $$P'_{DRXcycle}$$

is the number of SL slots corresponding to ms units in the NR SL DRX cycle ($P_{DRXcycle}$), $P_{DRXcycle}$ is the ms value of the NR SL DRX cycle, and N may be the number of SL slots existing within 20 ms (Common TDD-UL-DL setting). That is, based on the following Equation 3, a logical slot may be converted into an absolute unit of time in ms.

$$P'_{DRXcycle} = \left\lceil \frac{N}{20 \text{ ms}} \right\rceil \times P_{DRXcycle} \qquad \text{[Equation 3]}$$

A DRX resource pool may be set in consideration of an NR SL DRX operation. For example, a dedicated resource pool for transmitting and receiving the NR SL DRX UEs may be set as a DRX resource pool. For another example, the DRX resource pool is not segmented, but may be determined by defining some time resources in a general resource pool for PSCCH monitoring. Also, in order to avoid resource pool separation, a UE with the NR SL DRX set in an existing resource pool may also be able to operate.

Also, for example, the parameters as shown in Table 15 below may be provided to a SL UE in which the NR SL DRX configuration is set by default in the RRC layer may be provided to the MAC layer. Here, the parameters of Table 15 may be set in consideration of the DRX parameter Table 11 for the Uu link.

TABLE 15 drx-onDurationTimerSL: the duration at the beginning of a SL
DRX Cycle;
drx-SlotOffsetSL: the delay before starting the drx-
onDurationTimerSL;
drx-InactivityTimerSL: the duration after the PSCCH(or PSCCH/
PSSCH) occasion in which a PSCCH(or PSCCH/PSSCH) indicates
a new SL transmission for the MAC entity;
drx-RetransmissionTimerSL (per SL HARQ process): the maximum
duration until a SL retransmission is received;
drx-LongCycleStartOffsetSL: the Long SL DRX cycle and drx-
StartOffsetSL which defines the subframe where the Long and Short
DRX Cycle starts;
drx-ShortCycleSL (optional): the Short SL DRX cycle;
drx-ShortCycleTimerSL (optional): the duration the UE shall follow
the Short SL DRX cycle;
drx-HARQ-RTT-TimerSL: the minimum duration before a SL
assignment for a HARQ retransmission is expected by the MAC entity;

Also, the DRX parameters may be configured by at least one or more combinations per UE (e.g., per UE, per direction (link)-specific or per peer UEs transmitting unicast/groupcast), per resource pool, per QoS (Quality of Service) class (PC5 QoS Identifier, PQI), per service type (e.g., PSID/ITS-AID), per LCH (Logical Channel) or per SL Grant (SL HARQ process) as shown in Table 13, and it is as aforementioned. In the following, for the convenience of description, the NR SL DRX configuration is referred to as a DRX process but is not limited to the name.

Here, depending on the configuration of the RRC layer, one or more NR SL DRX groups may be configured including at least some or all of the parameters of Table 15. Each NR SL DRX group may independently set the parameter values included in the corresponding NR SL DRX group. For example, some parameters may not be included in the configured NR SL DRX group and may be applied to all those in common.

Also, the Uu DRX group and the SL DRX group may be configured independently. However, for example, some parameters may be set in common between the Uu DRX group and the SL DRX group. Also, some parameters between the Uu DRX group and the SL DRX group may be set and adjusted in consideration of the Uu DRX operation and the SL DRX operation.

Specifically, a SL on-duration timer (SL onDuration Timer) and a SL inactivity timer (SL inactivity timer) may be set for each NR SL DRX group. Here, the NR SL DRX group may be a group using an NR SL DRX configuration that is independent of each other. For example, an NR SL DRX group may apply independent NR SL DRX timer settings for each target QoS class (PQIs or set of PQIs), cast type, resource pool, or SL grant.

On the other hand, for example, the SL HARQ RTT Timer (SL HARQ RTT Timer) and the SL retransmission timer may all be applied to a common value regardless of the NR SL DRX group. Alternatively, independent SL HARQ RTT Timer and/or SL retransmission timer values may also be applied for each NR SL DRX group. However, this is only one example, and the common NR SL DRX parameter setting and the independent NR SL DRX parameter setting may be configured differently and are not limited to the aforementioned example.

In view of the foregoing, it may be possible to set a common NR SL DRX parameter or an independent NR SL DRX parameter setting based on all the possible combinations of all the NR SL DRX parameter configurations that can be configured in the RRC layer, and are not limited to the aforementioned example.

As another example, the NR SL DRX group configuration may be configured independently for a Unicast PC5 connection (UC). Also, the NR SL DRX group configuration may be configured independently for the Groupcast (GC). Also, the NR SL DRX group configuration may be configured independently for the broadcast (BC). Also, a common NR SL DRX configuration may be provided for at least one of broadcast, groupcast, and unicast before the establishment of a PC5 connection. Also, within a common NR SL DRX configuration, the independent NR SL DRX configurations may be included for each or each set of QoS class, service type, and/or LCH. That is, a common NR SL DRX configuration may be provided to an NR SL DRX UE for at least one of the cast types, QoS classes, service types, and LCHs, except when optimizing the NR SL DRX between two UEs, such as for unicast.

Based on the above, the following describes a method of setting the NR SL DRX configuration when only the NR SL DRX is considered without considering the UU DRX operation.

For example, the DRX between the base station and the UE may be configured in consideration of only the Uu link between the UE and the base station. On the other hand, as described above, the SL has a plurality of UE pairs based on the cast type, and the QoS classes or service types may be set in various ways. Therefore, the DRX for the SL needs to be configured in consideration of the above conditions. In consideration of the above, the following describes a method of configuring the NR SL DRX.

With respect to the NR SL DRX configuration, the SCI specific DRX cycles/SCI specific SL active times and SCI specific onDuration may be applied in consideration of the SL time domain resource allocation characteristics. More specifically, the SL long DRX cycle (SL longDRX-Cycle) may be set based on the SL on-duration timer (SL onDurationTimer) and the SL long DRX cycle (SL longDRX-Cycle) parameter value based on the higher layer configuration. Here, the SCI based onDuration parameter value may be additionally provided through the higher layer or SCI. That is, when the Tx UE transmits SCI to the Rx UE performing a DRX operation, the Tx UE may indicate specified NR SL DRX configuration information in connection with the SCI transmission. Here, the NR SL DRX configuration specified in connection with the SCI transmission may be an NR SL DRX operation specified in the SCI transmission associated with each specific UE, cast type, QoS, or LCH as described above.

As another example, the SCI-based onDuration parameter value is not provided through the higher layer, but may follow the value set based on the existing NR SL DRX configuration (e.g., SL onDurationTimer). That is, when the UE in which the NR SL DRX is set, based on the SCI, sets the SCI specific DRX cycle/SCI specific SL active time and SCI specific onDuration, the UE may apply the SL on-duration parameter (or SL active time related parameter) value previously received for the purpose of setting other DRX through the higher layer, and is not limited to the aforementioned example. The existing other DRX configuration means, for example, the SL on-duration parameter in the default common DRX configuration information in the default format before the RRC configuration is connected, as well as other DRX configuration parameters included together. More specifically, referring to FIG. 8, on-duration timer and a SL long DRX cycle on the UE for the NR SL DRX may be set through the higher layer. Also, other parameters (e.g., inactivity timer) for the NR SL DRX operation may be set through the higher layer in the UE, and are not limited to the aforementioned example.

Here, one or more SCI specific DRX cycles or an SCI-specific SL active time may be applied within a SL long DRX cycle. Each SCI-specific DRX cycle (or SCI-specific SL active time) may be set based on at least one of the time resource allocation information and resource reservation information indicated by the SCI. That is, in FIG. 8, the SCI based DRX cycle may be based on time resource allocation information and resource reservation information indicated by the SCI.

Specifically, one SCI signaling in a SL may reserve a plurality of time resources. Here, the maximum number of time resource reservations possible through one SCI signaling may be 3. For example, the UE may set the maximum number of time resource reservations, 2 or 3, through higher layer signaling.

When the number of maximum time resource reservations is set to 2, the UE may be able to transmit PSCCH/PSSCH for one TB transmission on one or two slots according to SCI signaling. On the other hand, when the maximum number of time resource reservations is set to 3, the UE may be able to transmit PSCCH/PSSCH for one TB transmission on one, two, or three slots according to SCI signaling.

Figure 8:
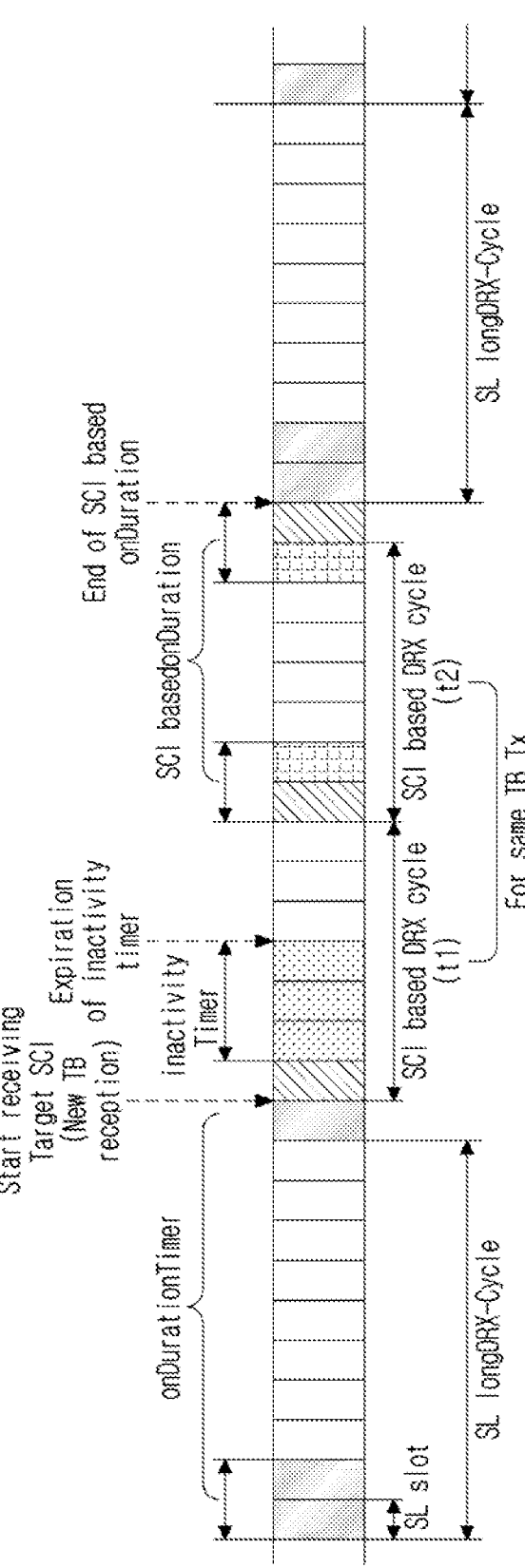
FIG. 8 illustrates a method for establishing an SCI-based DRX cycle to which the present disclosure may apply.

In this case, referring to FIG. 8, when a PSCCH/PSSCH for one TB transmission is indicated on three slots through one SCI, the UE may transmit one TB through three slots. For example, the UE may receive a target SCI indicating a new SL data transmission (new TB). That is, the UE may receive $1^{st}$ SCI (PSCCH) and/or $2^{nd}$ SCI (PSSCH) (hereinafter collectively referred to as SCI) indicating scheduling information and related control information of the new TB transmission. Here, the Tx UE and the Rx UE may recognize each other based on the source ID and destination ID of the SCI including the SL scheduling information. Also, for example, the Rx UE may identify that it is a new TB transmission through a field (e.g., new data indicator field) in the SCI. That is, the Rx UE may receive and identify the intended target SCI from the Tx UE to be transmitted to itself through the information described above.

When the Rx UE receives a target SCI indicating a new TB transmission, the SL inactivity timer may be started after the slot receiving the target SCI, and the Tx UE and the Rx UE may recognize it. The SL inactivity timer value may be provided by the higher layer setting. When the SL inactivity timer does not receive a new SL transmission during the time when the timer is operating, the SL inactivity timer may expire, and when the SL inactivity timer expires, the UE may enter a sleep mode.

However, since the number of maximum time resource reservations indicated by the SCI may be a plurality, the UE may maintain an active state to perform a TB transmission at the time resource indicated by the SCI. In view of the foregoing, an SCI based DRX cycle may be indicated through SCI as time interval information (e.g., t1, t2) between time resources. Also, based on the SCI based DRX cycle, the SCI based onDuration timer may be instructed to start at a time resource indicated for the TB transmission through the SCI. Through this, the UE may receive the TB from a time resource indicated by the SCI.

For a specific example, in a particular SL long DRX cycle, the NR SL DRX UE may receive an SCI (i.e. Target SCI) associated with one HARQ process corresponding to itself. Here, the target SCI may indicate control information for receiving a new TB. When the UE receives the target SCI, the SL inactivity timer may start from the next slot (or the OFDM symbol) immediately after receiving the target SCI.

The UE may monitor the reception of other target SCIs until the SL inactivity timer expires. Here, when the UE obtains additional resource reservation and allocation information through the target SCI, a SL DRX cycle may be set based on the obtained information. For example, the maximum number of time resource reservations may be indicated through the target SCI, such that the plurality of time resources may be allocated to the UE from the one SCI. The Rx UE may additionally set a SL DRX cycle in consideration of a plurality of the allocated time resources. That is, the Tx UE may instruct the Rx UE of an additional SCI based DRX cycle based on the resource reservation/allocation information in the SCI also to the SL long DRX cycle semi-statically set through the higher layer.

For another example, a higher layer parameter (e.g., sl-MaxNumPerReserve) corresponding to the maximum number of the PSCCH/PSSCH time resource allocations available by one SCI may be set in the UE. Also, the UE may identify the PSCCH/PSSCH resource allocation information corresponding to the higher layer parameter information in the received SCI. Here, the UE may redefine and use an SCI based DRX cycle based on the resource allocation information. For example, when set to "sl-MaxNumPerReserve=3", 1, 2, or 3 different time resources may be reserved to the UE by one SCI. In this case, in FIG. 8, the time resource reservation scheduling information including the three different time resource allocation information may correspond to SCI-based DRX cycles t1 and t2, respectively. The value of t1 and t2 may be determined through the time resource scheduling information received from the SCI, respectively. That is, through the time resource scheduling information provided by the SCI, an additional on-duration of the NR SL DRX UE may be implicitly indicated thereafter.

Also, for example, the SL-based on-duration may be used to indicate an additional on-duration of the NR SL DRX UE based on the start time of the slot determined by the t1 and t2 values. The SL based on-duration value may be indicated by a higher layer signaling (e.g., RRC or MAC CE) or may be indicated by the defining additional fields in the SCI.

As another example, if a SL based on-duration value is not defined or set, the on-duration may be set only to a slot indicated by a time domain allocation.

For another example, when the UE receives SCI from another UE operating on the basis of the UE scheduling mode (mode 2), in addition to the time resource allocation based on the t1 and/or t2 values, the UE may additionally set an SCI based DRX cycle based on the resource reservation cycle value indicated through the SCI received from the other UE. That is, it may be possible to set an additional SCI based DRX cycle.

Also, for example, if there is no additional time resource scheduling after the SCI based DRX cycle (t2) in FIG. 8, the SL long DRX cycle may be started from the slot (or the OFDM symbol) after the SCI based on-duration. Also, for example, the SL long DRX cycle set may start anew from the SL long DRX cycle time set by the existing higher layer after the SCI based on-duration is completed, and is not limited to the aforementioned example.

Figure 9:
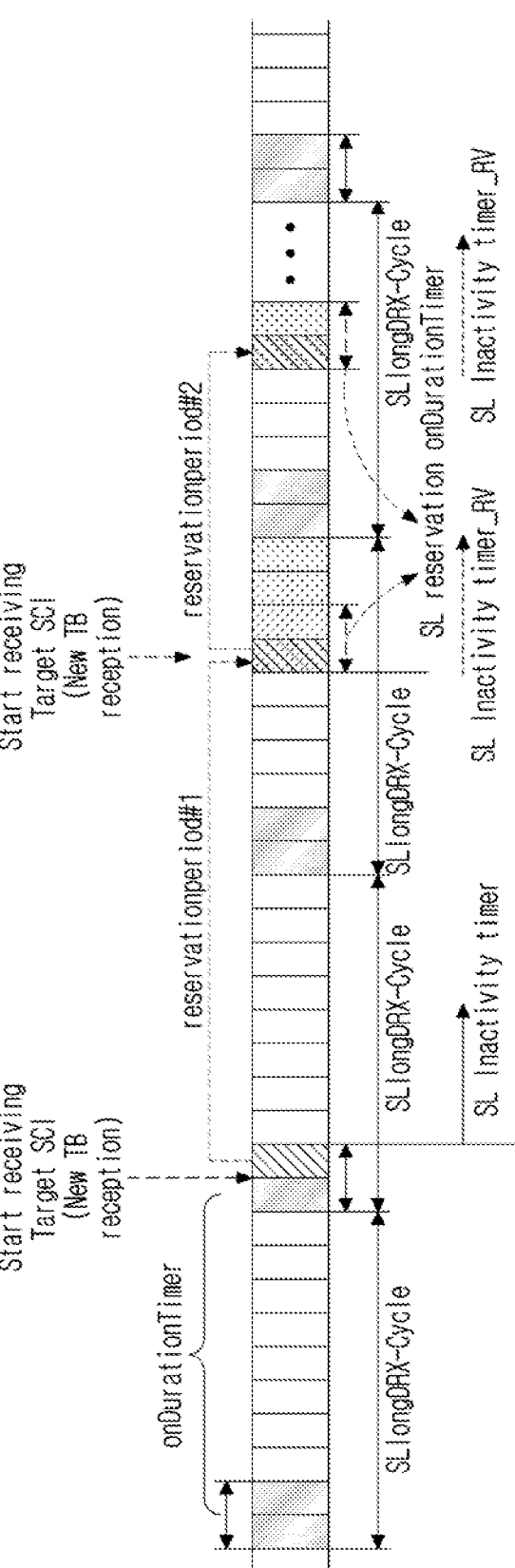
FIG. 9 illustrates a method for setting on-duration and off duration timers based on resource reservation information to which the present disclosure may apply.

Referring to FIG. 9, the Tx UE may transmit the target SCI to the Rx UE for SL communication. The Rx UE may set the NR SL DRX configuration based on the information indicated by the received target SCI. Here, resource reservation period field information may be included in the SCI transmitted by the Tx UE. The Rx UE receiving the target SCI, which includes the resource reservation period field information in which the NR SL DRX configuration is set, may determine an additional NR SL DRX cycle or an SL active time based on the resource reservation cycle field value.

More specifically, the NR SL DRX operation for SL communication may be configured differently from the DRX operation of the existing NR Uu link. Here, the SL NR SL DRX cycle and the SL active time may be set based on the resource reservation period field information. That is, in addition to the DRX cycle (e.g., SL long DRX cycle) set at the higher layer for the NR SL DRX, an additional NR SL DRX cycle and an SL active time corresponding to at least any one of a specific service type, QoS, LCH, and cast type may be set.

Accordingly, the UEs may generally set the NR SL DRX cycle and the SL active time in addition to the DRX cycle and related operations set through the already set NR SL DRX cycle and the related parameters. Here, the NR SL DRX cycle and the SL active time to be additionally set may be set according to the specialized data traffic corresponding to at least any one of the service types, QoSs, LCHs, and cast types based on Table 13 above. Through this, the efficient SL data transmission may be performed, and the power consumption of the Rx UE may be minimized.

As a specific example, referring to FIG. 9, the NR SL DRX cycle and the SL active time may be indicated based on the resource reservation period field value in the SCI. When the Rx UE receives the target SCI, the Rx UE may indicate in the resource reservation cycle field in the SCI, and then set the reservation slot as an additional NR SL DRX cycle and a SL active time starting point. For example, in FIG. 9, the resource reservation period field of the SCI may indicate "reservation period #1". Here, the NR SL DRX cycle and the SL active time may be set in the reservation slot indicated by "reservation period #1". For example, a SL reservation onDuration timer and a SL reservation inactivity timer may be started in the reservation slot indicated by "reservation period #1". That is, a SL on-duration timer and a SL inactivity timer related to the resource reservation cycle field may be set, but may not be limited to the aforementioned names. Through this, the Rx UE may maintain an active state for a predetermined period of time from the reserved slot, and may be converted to a sleep state after a certain interval based on an active timer.

The Rx UE may receive a value corresponding to the resource reservation field value through a higher layer parameter that is different from the general SL inactivity timer. As a specific example, in the reservation slot indicated by the resource reservation cycle field in FIG. 9, an additional on-duration time for two slots may be indicated by one additional NR SL DRX cycle. Thereafter, an additional NR SL DRX cycle may be indicated based on a "reservation period #2" value indicating the next reservation slot. Also, the Rx UE may efficiently support the periodic data transmission bursts by receiving an independent SL inactivity timer value related to the resource reservation field (SL inactivity timer_RV) through the higher layer.

That is, the Rx UE on which the NR SL DRX is set may additionally set the NR SL DRX cycle (SL active time) based on the resource reservation cycle field independent of the basic NR SL DRX cycle (e.g., SL long DRX cycle). In this case, the Rx UE may receive an on-duration time timer and a SL inactivity timer value in the corresponding NR SL DRX cycle as additional parameters through the higher layer.

As another example, the on-duration timer value and the SL inactivity timer value set based on the resource reserve cycle field may be preset values. When the UE on which the NR SL DRX is set receives an SCI including resource reservation cycle field information, the Rx UE may set the NR SL DRX cycle and active time based on the preset on-duration timer value and the SL inactivity timer value. Also, for example, the on-duration timer value and the SL inactivity timer value may be set as semi-static and are not limited to the aforementioned example.

As another example, the on-duration timer value and the SL inactivity timer value set based on the resource reserve cycle field may follow a value set based on the existing NR SL DRX configuration (e.g., SL long DRX cycle). The NR SL DRX that is set receives an SCI including the resource reservation cycle field information, the Rx UE may apply the on-duration parameter value and the SL inactivity timer parameter received through the higher layer for the NR SL DRX setting and is not limited to the aforementioned example.

Figure 10:
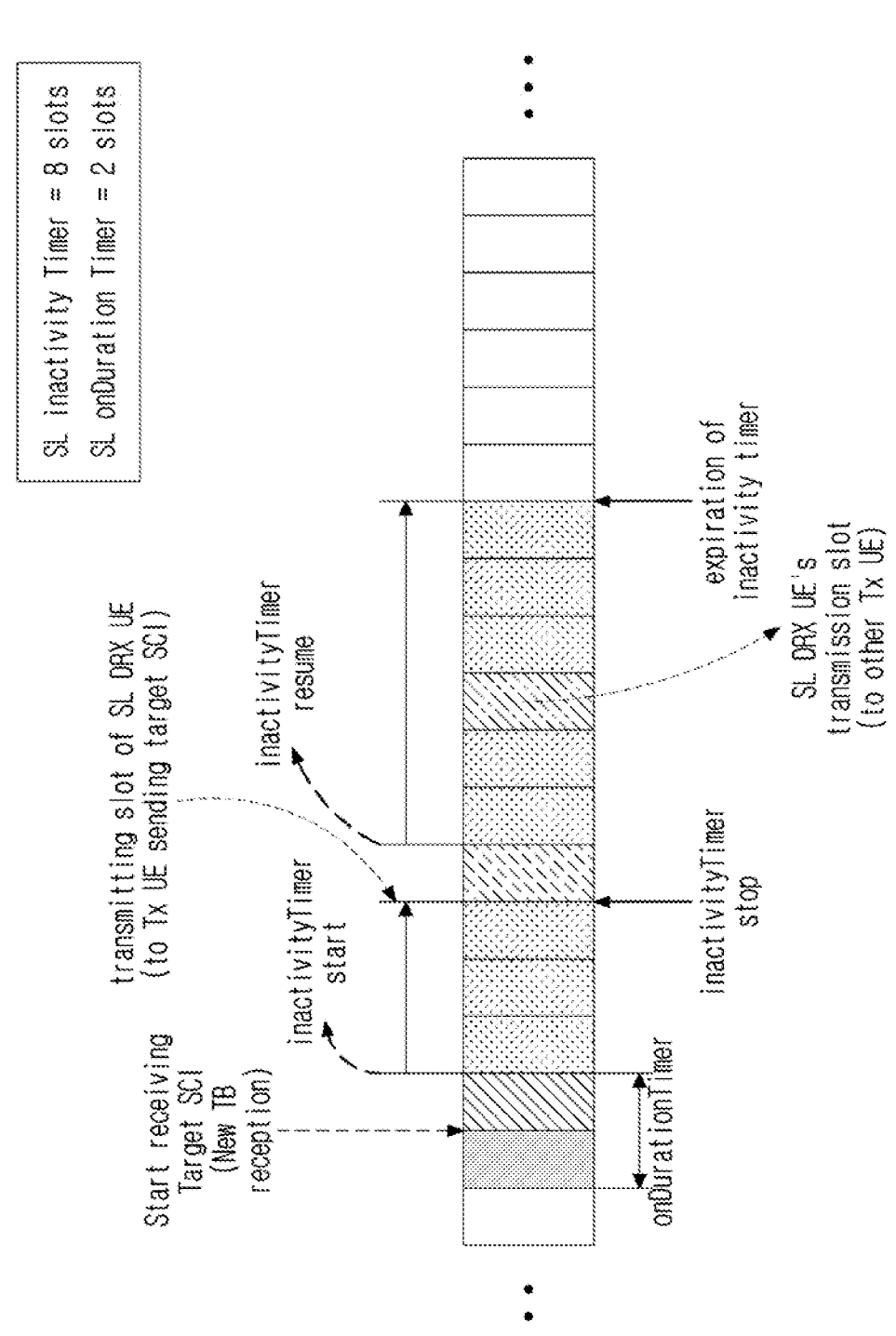
FIG. 10 illustrates a SL DRX operation based on a half-duflex constraint to which the present disclosure may apply.

As another example, a UE performing SL communication may not be able to transmit and receive at the same time. That is, there may be a half-duplex constraint in the SL UEs. For example, in the air interface (e.g. NR Uu) between the base station and the UE, transmission and reception may be performed at the same time. On the other hand, in SL communication, the UEs may perform only one of the transmitting or receiving operations, and may not perform them at the same time. Here, the NR SL DRX configuration may be set in consideration of the half-duplex constraint. For example, referring to FIG. 10, the UE starts an on-duration timer based on the NR SL DRX configuration, and if the on-duration timer receives a target SCI indicating a new TB while the on-duration timer is operating, the inactivity timer may be started. For example, the SL on-duration timer may be set to 2 slots, and the SL inactivity timer may be set to 8 slots. However, this is only one example and is not limited to the aforementioned example. Here, the Rx UE may be in an active state when the on-duration timer is operated and when the inactivity timer is operated, and the target SCI transmitted by the Tx UE may be monitored. Here, when the Rx UE transmits the SL data to the corresponding Tx UE that transmits the target SCI, the inactivity timer may be stopped in the slot in which the SL data transmission is performed. Thereafter, if the SL data transmission is terminated, the inactivity timer may be resumed in the next slot of the slot in which the SL data transmission was terminated. On the other hand, when the Rx UE transmits the SL data to a Tx UE other than the corresponding Tx UE that transmits the target SCI based on another session or cast type, the inactivity timer associated with the Tx UE may be continuously operated without interruption.

That is, when at least any one of an onDuration timer, an inactivity timer and a retransmission timer corresponding to the active time of the UE (i.e., the time at which the NR SL DRX UE is activated to monitor at least the SCI) of the UE, the UE transmits the data and control signals to the Tx UE associated with the timers in a specific slot (i.e., the slot in which the SL DRX Rx UE attempts to transmit the SL data to the Tx UE that maintains the timer the same), the SL DRX timer may be interrupted before that particular transmission slot, and the timer may resume again after the transmission is terminated. For example, unlike the NR Uu, the SL UE may not simultaneously perform the reception operation at the time of transmission due to the half-duplex constraint, so the reception operation intended by the timer indicating the active time may be greatly affected by the transmission operation. Therefore, in order to perform an SCI monitoring operation to the number of timers indicating a set or indicated active time, it is necessary to exclude the timer count of the transmission slot in which the SL data transmission is performed to the UE associated with the timer.

However, if the transmission of the NR SL DRX UE is for a third UE (e.g., another unicast connection UE, another QoS class, other LCH, etc.) that transmits the target SCI (i.e., a UE associated with the corresponding SL DRX operation) that starts a timer indicating the active time, the UE may not interrupt the timer indicating the active time. In this case, unless the NR SL DRX UE performs the SL transmission to the Tx UE, the Tx UE may not align with the NR SL DRX UE and the timer indicating the active time.

For example, in the case of unicast, the pair of the Tx UE and the Rx UE may be confirmed by a specific source ID and a destination ID (source ID/Destination ID). Here, the Rx UE has started a timer indicating the activation time started by the received SCI, but when the NR SL DRX UE performs an SL transmission corresponding to the third small ID and the destination ID or the UE, the timer indicating that the started active time may be continuously counted without stopping.

As described above, the SCI received by the UE performing the NR SL DRX operation may be a UE perspective. However, based on Table 13, based on the unit (e.g., for each cast type, SL grant, resource pool, cast session number, QoS (PQI), or LCH) to which the NR SL DRX configuration is applied, the DRX related timer and the above operation may be applied in the same way, and are not limited to the aforementioned example.

In the Uu DRX between the base station and the UE, only one inactivity timer value for each DRX group can be set by the higher layer and used. On the other hand, in the SL communication between the UEs, various SL data transmission and reception methods are mixed, so a method of using a timer adaptive (e.g., soft timer) may be required. For example, a timer that is used adaptively in SL communication may be applied in the consideration of at least one of the data traffic characteristics, service characteristics (PQI/QoS/LCH), cast types, and resource allocation/allocation methods based on Table 13.

Specifically, in the NR UU between the base station and the UE, the inactivity timer value may be set in the higher layer and used as a semi-static. However, in the SL communication, since the data transmission and reception are performed based on the various environments as described above, there may be a limitation that causes inefficient resource utilization and the UE DRX operation when a fixed value is used.

Figure 11:
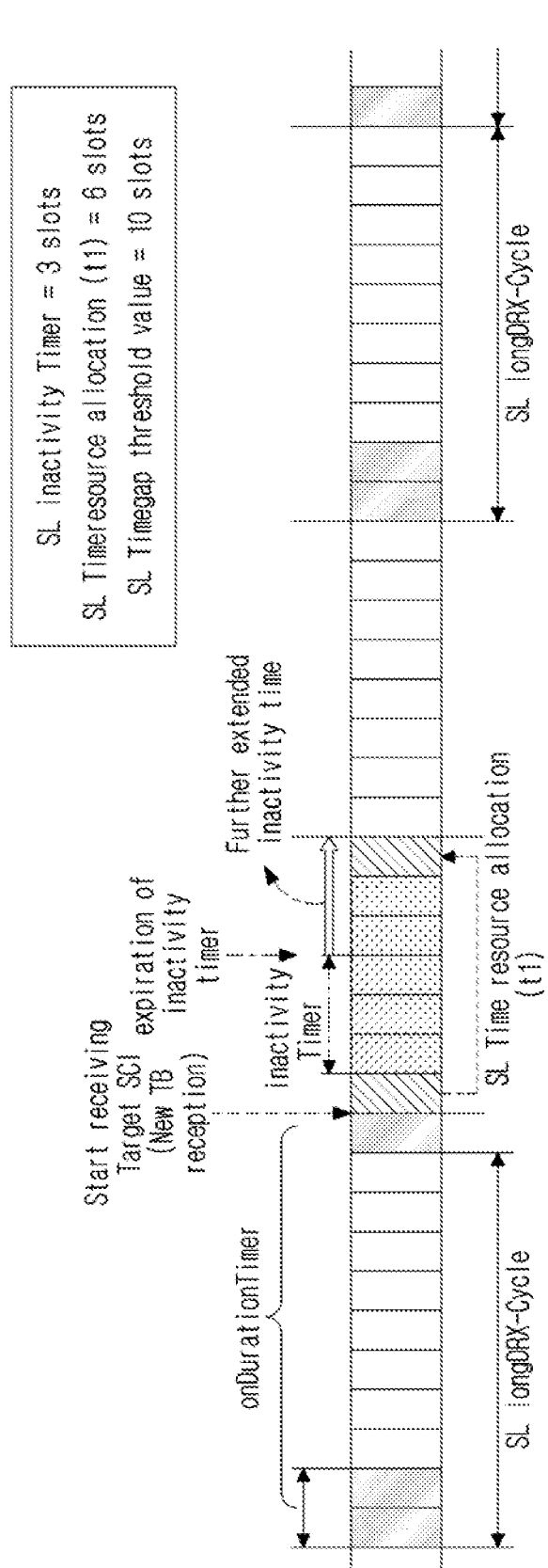
FIG. 11 illustrates a method for controlling a timer based on a SL time gap threshold value to which the present disclosure may apply.

More specifically, referring to FIG. 11, a Tx UE in which the NR SL DRX is set may continuously transmit the SL data to the Rx UE. The Tx UE may transmit the target SCI to the Rx UE and perform an SL data transmission on a resource scheduled by the SCI. For example, the time interval (t1) between the consecutive SL data in FIG. 11 may be 6 slots. Here, the SL inactivity timer may be set to three slots through the higher layer parameter and may be set to semi-static. However, the time resources scheduled by the SCI may be flexible. Here, since the SL inactivity timer is set semi-fixedly, it may not be able to support the time resources scheduled by the dynamically allocated SCI. That is, the Rx UE in which the NR SL DRX is set should receive the SL data from a time resource scheduled by the SCI, but the SL inactivity timer has already expired and switched to a sleep state.

Also, for example, in the timer (e.g. the inactivity timer, retransmission timer) for the active time, there may be a problem that the Rx UE does not receive the SL data as described above. The following describes a SL inactivity timer for the convenience of the description, but the same can be applied to the timers for other active times, and is not limited to the aforementioned example.

The Rx UE on which the NR SL DRX is set may switch to a sleep state when the SL inactivity timer expires and may not receive the SL data. Accordingly, an SL time gap threshold value for extending the SL inactivity timer is defined, and an NR SL DRX operation may be performed based thereon. The SL time gap threshold value may be signaled by the Tx UE to the Rx UE through at least one of the higher layer and SCI signaling. For example, the SL time gap threshold value may be compared to the time interval between the time when the SL inactivity timer ends and the second SL transmission resource. In this case, if the time interval between the time when the SL inactivity timer is terminated and the second SL transmission resource is less than the SL time gap threshold value, the SCI monitoring the time of the Rx UE may be extended to the next retransmission slot even if the inactivity timer expires. As another example, if the time interval between the end of the SL inactivity timer and the second SL transmission resource is less than the SL time gap threshold value, the SL inactivity timer value may be extended by a time corresponding to the interval between the expiration of the SL inactivity timer and the next SL data retransmission receives slot. Also, if there is an additional time resource for the same TB transmission, and the time interval between the end of the SL inactivity timer and the additional time resource SL transfer resource is less than that of the SL time gap threshold value, the SL inactivity timer value may be extended by the time corresponding to the interval after the SL inactivity timer expires to the additional resource.

Also, if there is resource reservation cycle information for other TB transmissions, and the interval between the time when the SL inactivity timer ends and the resource based on the resource reservation cycle is less than the SL time gap threshold value, the SL inactivity timer value may be extended by a time corresponding to the value between the resources based on the resource reservation cycle after the SL inactivity timer expires. As another example, it is also possible to ensure that the active time is not extended because the resource reservation cycle for another TB transmission is not a transfer for the same TB and is not limited to the aforementioned example.

That is, if the interval between the time when the SL inactivity timer is terminated and the next SL transmission cycle is small compared with the SL time gap threshold value, it can be maintained in the active state to ensure the next transmission. On the other hand, if the interval, between the time when the SL inactivity timer ends and the next SL transmission cycle, is large compared with the SL time gap threshold value, the active time is not guaranteed in the consideration of power consumption, and it may be converted to a sleep state.

As another example, the SL time gap threshold value may be compared to the interval between the first SL transmission and the second SL transmission. As a specific example, in FIG. 11, the interval between the first SL transmission and the second SL transmission (t1) and the SL time gap threshold value may be compared. In this case, if the interval between the first SL transmission and the second SL transmission (t1) is less than the SL time gap threshold value, the SCI monitoring time of the Rx UE may be extended to the next retransmission slot even if the inactivity timer expires. As another example, if the interval between the first SL transmission and the second SL transmission (t1) is less than the SL time gap threshold value, the SL inactivity timer value may be extended by the time corresponding to the interval until the next SL data retransmission reception slot after the SL inactivity timer expires. Also, if there is an additional time resource for the same TB transmission, and the interval between the first SL transmission and the second SL transmission (t1) is less than the SL time gap threshold value, the SL inactivity timer value may be extended by the time corresponding to the interval to the additional time resource after the SL inactivity timer expires.

Also, if there is resource reservation cycle information for another TB transmission, and the interval between the first SL transmission and the second SL transmission (t1) is less than the SL time gap threshold value, the SL inactivity timer value after the SL inactivity timer expires, and it can be extended by the time corresponding to the value between the resources based on the resource reservation cycle. As another example, it is also possible to ensure that the active time is not extended because the resource reservation cycle for another TB transmission is not a transfer for the same TB, and is not limited to the aforementioned example.

That is, if the interval between the first SL transmission and the second SL transmission (t1) is compared with the SL time gap threshold value, the active state may be maintained to ensure the next transmission. On the other hand, if the interval between the time when the SL inactivity timer ends and the next SL transmission cycle is large compared with the SL time gap threshold value, the active time is not guaranteed in the consideration of power consumption, and it may be converted to a sleep state.

As a specific example, referring to FIG. 11, the SL time gap threshold may be 10 slots. Here, the SL time gap threshold value may be compared with the interval value between the first SL transmission and the second SL transmission (t1) or the time interval between the time when the inactivity timer expires and the second SL transmission resource to enable the Rx UE to perform an SCI monitoring when the time interval between when the inactivity timer expires and the second SL transmission resource is less than the SL time gap threshold value.

Figure 12:
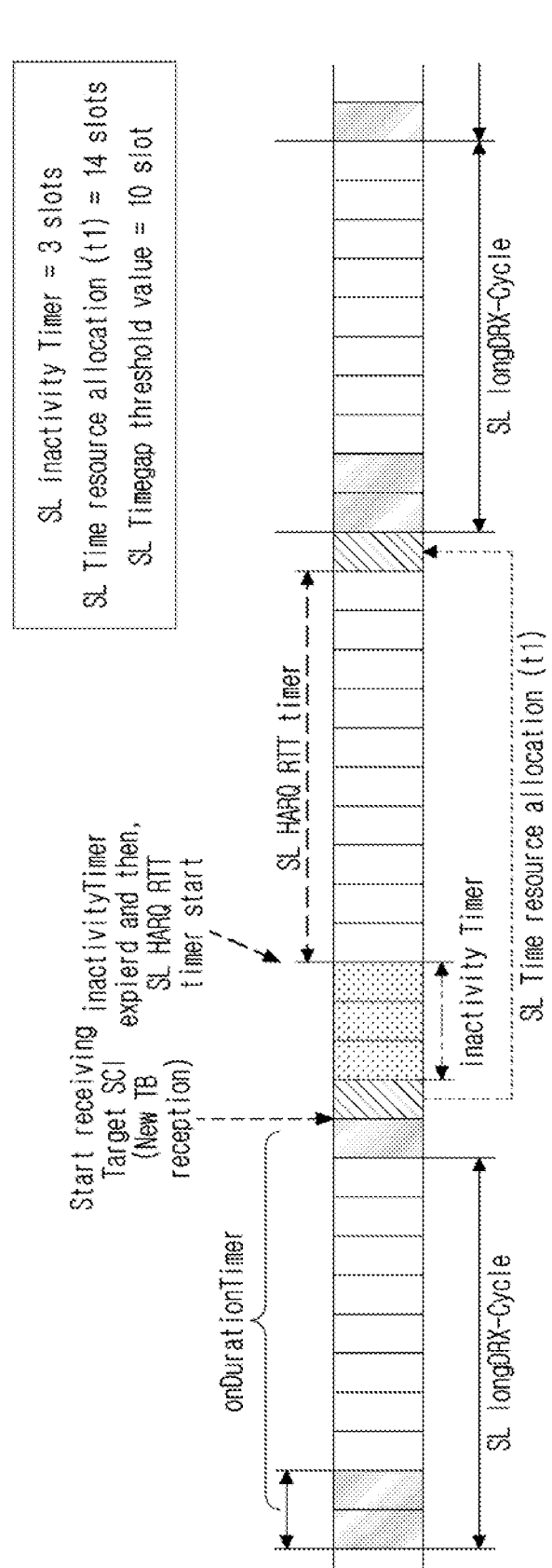
FIG. 12 illustrates a method for controlling a timer based on a SL time gap threshold value to which the present disclosure may apply.

As another example, referring to FIG. 12, the Rx UE receives the target SCI, and the SL HARQ RTT Timer may be started immediately after the SL inactivity timer is started and ended. For example, a SL HARQ RTT Timer may be started based on the NACK transmitted by the Rx UE. As another example, a SL HARQ RTT Timer may be started independent of the NACK transmission of the Rx UE, and is not limited to a particular example.

Here, the SL HARQ RTT Timer may be applied immediately before the next SL time transmission. The SL HARQ RTT Timer value may be determined by subtracting the interval from the first SL transmission to the next SL time transmission (t1) minus the SL inactivity timer expiration time. The Rx UE may be converted to a sleep state before the next slot in which the next retransmission is expected at a time corresponding to the SL HARQ RTT Timer value.

The SL HARQ RTT Timer value may be determined based on the interval value from the first SL transmission to the next SL time transmission (t1) and the time when the SL inactivity timer ends, as described above. As another example, the SL HARQ RTT Timer value may be determined as an independent value through the signaling provided through the higher layer. However, the SL HARQ RTT Timer value may be limited to the corresponding SL HARQ process. Therefore, when a UE monitoring operation corresponding to another SL HARQ process is required during the time when the SL HARQ RTT Timer is operating, the Rx UE may perform an NR SL DRX operation for another SL HARQ process.

As another example, when the SL time gap threshold value is not set or is 0, the SL time gap threshold value may be used as a predetermined value. As another example, if there is no predetermined SL time gap threshold value and the SL inactivity timer ends between the first SL transmission and the second transmission, the SL inactivity timer may be determined to always be extended. Alternatively, if there is no predetermined SL time gap threshold value and the SL inactivity timer ends between the first SL transmission and the second transmission, the SL HARQ RTT Timer may be started, and is not limited to the aforementioned example.

As another example, when a PSFCH resource is set to the NR SL DRX configured UE and the Rx UE performs a SL HARQ feedback transmission for the initial PSSCH reception based on the enabled SL HARQ feedback, the SL time gap threshold value may be compared with the time interval between the PSFCH transmission slot and the subsequent PSSCH retransmission slot. Through this, it may be determined whether the active time needs to be extended, and is not limited to the aforementioned example.

Figure 13:
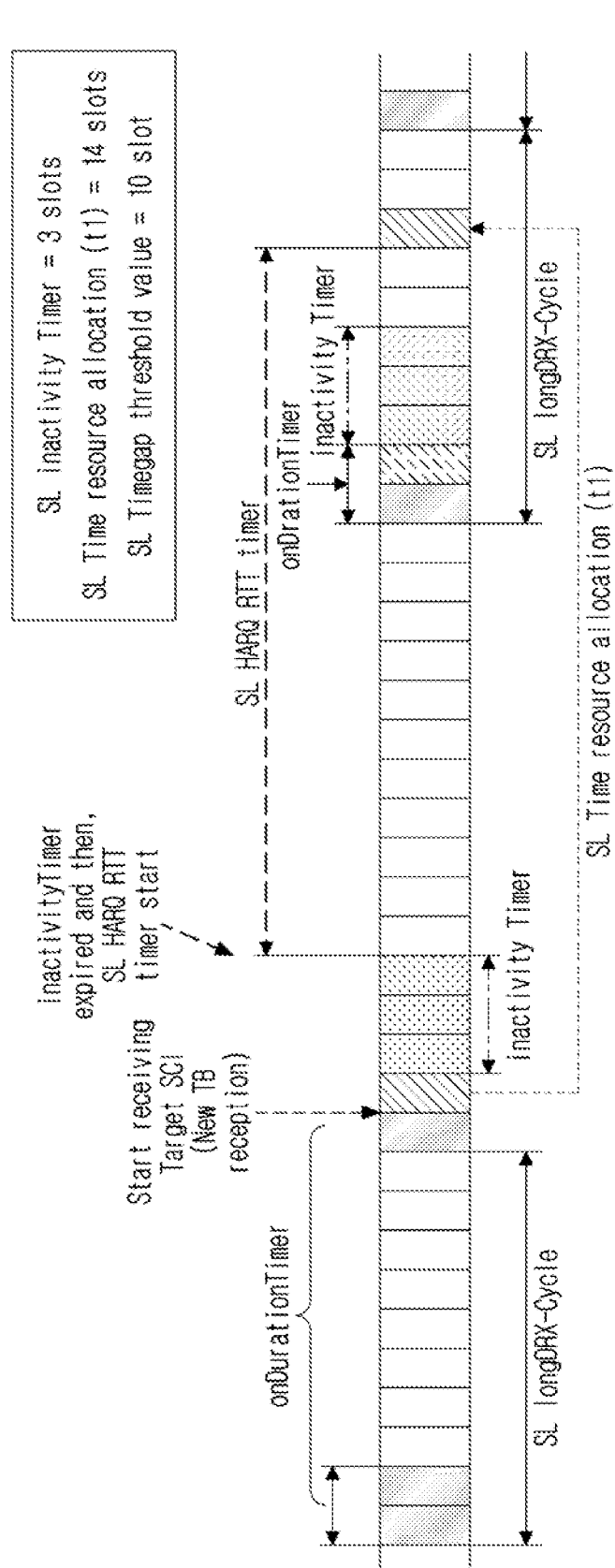
FIG. 13 illustrates a method for controlling a sidelink HARQ RTT timer if the SL DRX cycle is longer than the time resource allocation to which the present disclosure may apply.

As another example, referring to FIG. 13, the next SL transmission time resource by the SCI may be set to be longer than the SL long DRX cycle. Here, the SL HART RTT timer may be started after the SL inactivity timer ends. However, if the SL long DRX cycle is shorter than the next retransmission time, the on-duration timer may start before the SL HARQ RTT Timer ends. At this time, the SL HARQ RTT Timer may be continuously counted. That is, an NR SL DRX operation may be performed on a TB or SL grant corresponding to a SL HARQ RTT Timer.

As another example, the SL HARQ RTT Timer may be used up to the active time when the on-duration and the SL inactivity timers are operated. That is, the SL HARQ RTT Timer may expire just before the active time. Thereafter, the UEs may operate based on the configured NR SL DRX. The UEs may additionally determine the SL inactivity timer extension based on whether to start the active timer corresponding to the next DRX cycle. For example, the SL inactivity timer may be extended based on the SL time gap threshold value or extended independent of the aforementioned value, as shown in FIG. 8 described above.

As described above, one SCI may schedule a plurality of SL data transmissions. As another example, one SCI may direct only one SL data transmission resource. Also, the SL HARQ feedback may be set corresponding to the SL data transmission. The Tx UE may receive the SL HARQ feedback from the Rx UE. Also, the Tx UE may report the SL HARQ feedback to the base station.

Figure 14:
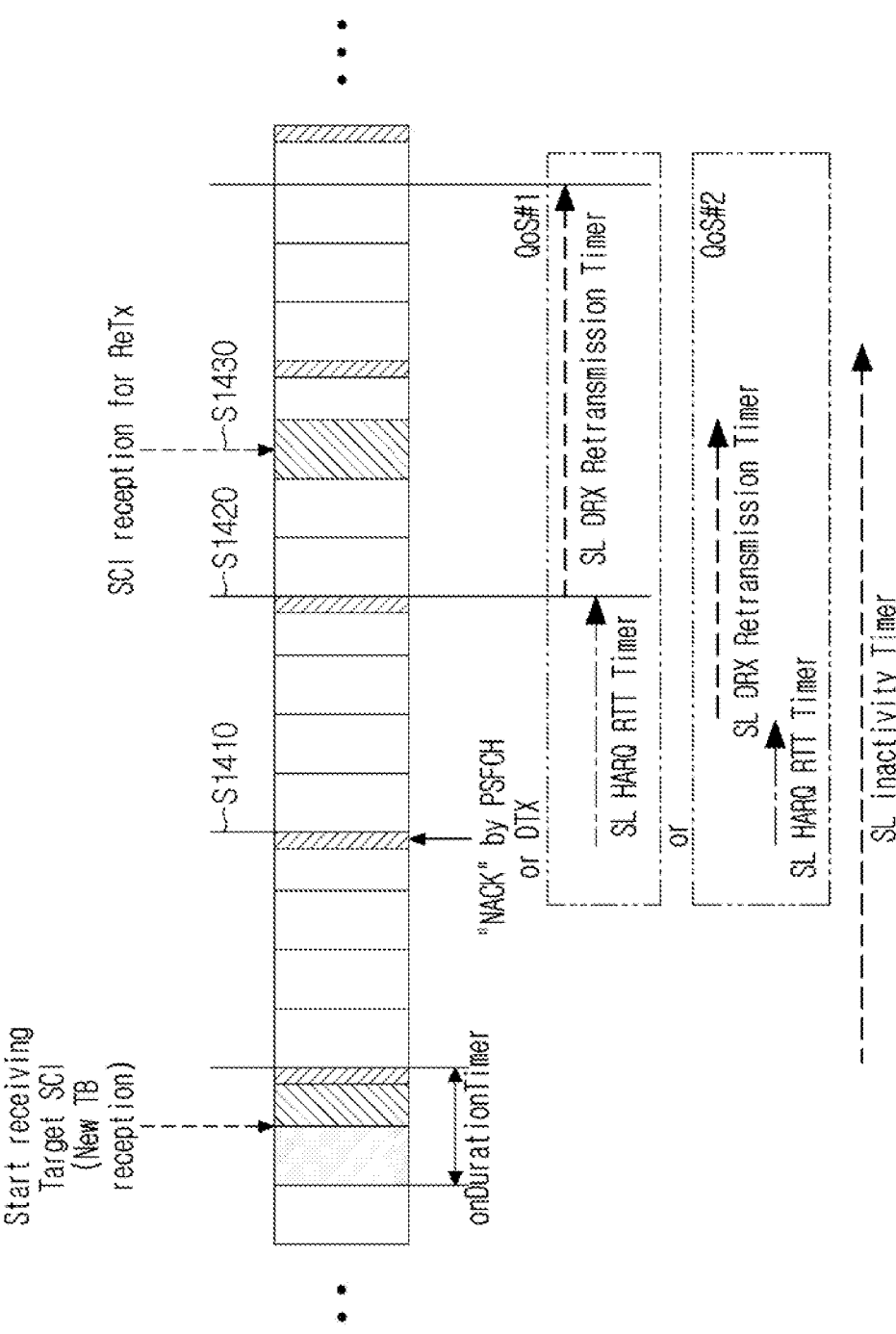
FIG. 14 illustrates a method for setting a timer based on each of the QoS to which the present disclosure may apply.

Here, referring to FIG. 14, the Rx UE may receive a new SL TB transmission from the Tx UE in an on-duration section. Thereafter, the Rx UE may perform the SL HARQ feedback transmission for the PSCCH/PSSCH (new TB) received on the PSFCH transmission resource based on the SL HARQ feedback setting. (S1410) Here, if the associated SL HARQ feedback is a NACK (i.e., when the retransmission is required because it is not successfully received), the Rx UE may transmit the NACK through a PSFCH to the Tx UE. In this case, the SL HARQ RTT Timer may be associated with a corresponding SL HARQ process. That is, each HARQ RTT timer may correspond to an SL HARQ process, respectively. Here, the SL retransmission on the SL HARQ process may not be expected in a time period when the corresponding SL HARQ timer is operating.

Also, for example, if the SL HARQ RTT Timer expires, the SL DRX retransmission timer may be started. (S1420) Here, the Rx UE may expect the SCI (PSCCH) and the retransmission data reception (PSSCH) indicating retransmission from the Tx UE during the time when the SL DRX retransmission timer operates. In this case, the Rx UE may receive a PSCCH and a PSSCH indicating a retransmission from the Tx UE during the time when the SL DRX retransmission timer operates. (S1430)

In this case, the SL HARQ RTT Timer and the SL DRX retransmission timer may be applied for each SL HARQ process. That is, for each SL HARQ process, a SL HARQ RTT Timer and a SL DRX retransmission timer may be set. In this case, the SL RTT timer value and the SL DRX retransmission timer value may be selected as any one of a plurality of values. In this case, the SL RTT timer value and the SL DRX retransmission timer value may be selected from one of a plurality of values. For example, the SL RTT timer value and the SL DRX retransmission timer value may be selected from one of a plurality of values based on at least one of the QoS class (e.g. PQI, priority level), the QoS feature (e.g. PDB), the LCH, and the cast type of the SL data transmitted and received through the corresponding SL HARQ process. In the case of the SL communication, since both the transmitting and the receiving UEs mutually recognize the characteristics of the SL data, a timer value may be selected as described above. For example, in FIG. 14, a SL HARQ process may be performed for different QoS classes (QoS #1 and QoS #2). Here, the SL HARQ RTT Timer and the SL DRX retransmission timer corresponding to each SL HARQ process may be applied differently. That is, the NR SL DRX operation can be set based on each SL data characteristic, through which the DRX operation can be effectively supported in the SL communication.

Figure 15:
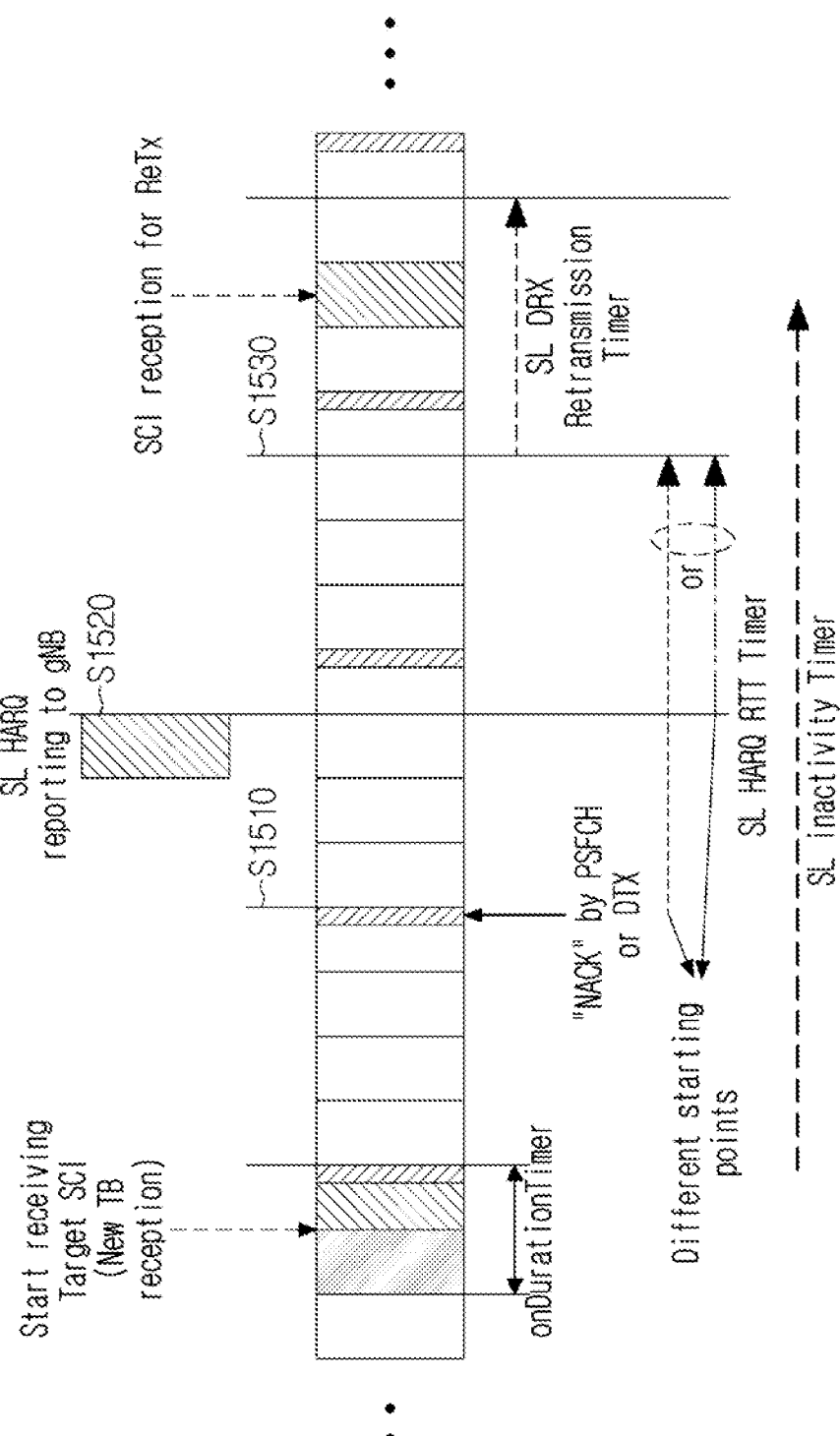
FIG. 15 illustrates a method for setting a timer based on a HARQ feedback to which the present disclosure may apply.

As another example, referring to FIG. 15, the Rx UE may receive a new SL TB transmission during the on-duration time. Here, a SL HARQ feedback may be set in the Rx UE. Accordingly, the Rx UE may perform the SL HARQ feedback transmission for the PSCCH/PSSCH (New TB) received on the PSFCH transmission resource. (S1510) Here, if the SL HARQ feedback is a NACK (i.e., when the retransmission is required because it is not successfully received), the Rx UE may transmit the NACK through a PSFCH to the Tx UE. If the Tx UE receives the NACK from the Rx UE, the Tx UE may again report the SL HARQ feedback information to the base station as a Uu channel/signal. (S1520) For example, the Tx UE may perform an SL HARQ feedback information reporting through at least one of a Physical Uplink Shared Channel (PUSCH) and a Physical Uplink Control Channel (PUCCH). Here, the SL HARQ RTT Timer may start from the first symbol after the Tx UE transmits the SL HARQ feedback information to the base station.

As another example, the SL HARQ RTT Timer may be started at a time when the Rx UE transmits an SL HARQ feedback through the PSFCH regardless of the SL HARQ feedback information report to the base station. That is, the SL HARQ RTT Timer may perform an SL HARQ feedback transmission and then start with the symbol. In this case, the Rx UE may not expect a retransmission for the corresponding HARQ process during the time when the SL HARQ RTT Timer is operating. The Rx UE may perform monitoring to check whether the SL HARQ RTT Timer is retransmitted when it expires. Here, the SL DRX retransmission timer may be started when the SL HARQ RTT Timer expires. (S1530) The Rx UE may receive SCI (PSCCH) indicating a retransmission from the Tx UE during the time when the SL DRX retransmission timer operates, and may receive the retransmission data (PSSCH).

The SL HARQ RTT Timer and the SL DRX retransmission timer may be applied for each SL HARQ process. That is, for each SL HARQ process, each of the SL HARQ RTT Timer and the SL DRX retransmission timer may be set. The SL RTT timer value and the SL DRX retransmission timer value may be a QoS class (e.g., PQI, priority level), a QoS feature (e.g.PDB) of the SL data transmitted and received through the corresponding SL HARQ process, or a LCH and cast type of the SL communication. In the case of the SL communication, since both the transmitting and the Rx UEs mutually recognize the characteristics of the SL data, a timer value may be selected as described above.

As another example, when the UE indicating one or more time-and-frequency resources for one TB through one SCI signaling, the SL HARQ RTT Timer and the SL DRX retransmission timer may not be applied. That is, since one TB may be transmitted through a plurality of time and frequency resources, the SL HARQ RTT Timer and the SL DRX retransmission timer may not be applied without considering the HARQ feedback. Therefore, the SL HARQ RTT Timer and the SL DRX retransmission timer may not start.

On the other hand, when the UE is indicating only one time-and-frequency resource for one TB through one SCI signaling, the SL HARQ RTT Timers and the SL DRX retransmission timers can be applied. Here, referring to FIG. 16 for example, the mode 2 UE may determine the SL HARQ RTT Timer value in consideration of the minimum time gap (minTime gap) or the reTx preparing a time for retransmission. Here, the minimum time gap may be the minimum time interval that the SL UE must consider between one PSSCH transmission and a plurality of time resources for a PSSCH transmission for a subsequent retransmission. That is, the minimum interval includes the time interval between the end of the last symbol of the first PSSCH transmission to the first symbol of the associated PSFCH reception and the necessary physical channel transmission preparation time for a PSFCH reception and retransmission (e.g. Tx-Rx switching, multiplexing). Also, the retransmission preparation time may be set based on the time including the time (e.g. Tx-Rx switching, multiplexing) to prepare for a PSFCH reception and a physical channel transmission required for retransmission.

In this case, the SL HARQ RTT Timer value may be determined to be greater than or equal to the minimum time gap or retransmission preparation time. In particular, the retransmission preparation time may be a time determined based on the processing power of the UE and may be set to correspond to the capability of the UE. Also, for example, the Rx UE may explicitly or implicitly provide relevant information to the Tx UE through a capability signaling of the Rx UE.

That is, in case the Tx UE configured in Mode 2 is indicating only one time-and-frequency resource for delivering one TB through one SCI signaling to a Rx UE, the SL HARQ RTT Timer value for retransmission may be determined based on the minimum time gap or retransmission preparation time.

As another example, an SL HARQ feedback may be performed based on a soft DRX timer. Here, the SL inactivity timer for the UE in which the NR SL DRX is set may be adaptively controlled based on the SL HARQ feedback (whether the ACK signaling or the ACK judgment is performed).

More specifically, the NR SL DRX UE with the SL HARQ feedback set can flexibly adjust the DRX timer value. For example, referring to FIG. 17, a Rx UE with an NR SL DRX set may receive a target SCI indicating a new TB transmission. The Rx UE may start the inactivity timer value after the on-duration interval. The target SCI may reserve (or allocate) one or more additional SL resources.

Here, if the TB transmitted through the first SL resource is successfully received by the NR SL DRX Rx UE, the Rx UE may provide a feedback, the ACK, on the PSFCH resource associated with the received TB to the Tx UE. In this case, both the Rx UE transmitting the ACK and the Tx UE receiving the same may no longer count the SL inactivity timer. That is, the Rx UE may interrupt or expire the SL inactivity timer based on the judgment on the ACK. Also, the Tx UE may also suspend or expire the SL inactivity based on the ACK signaling. At this time, the SL resources can be dropped since there is no additional data transmission after the already indicated, thereby improving a resource efficiency and reducing power consumption.

As another example, the Groupcast HARQ feedback type 2 may not transmit an ACK if a data reception is successful and may transmit a NACK only if a data reception fails. In the case of the groupcast HARQ feedback type 2, the Tx UE may not detect the PSFCH reception (DTX), and in this case, it may be applied in the same way as the ACK.

Also, as an example, if a SL HARQ ACK or DTX (i.e. PSFCH) absence is transmitted through a PSFCH transmission as described above, the SL HARQ RTT Timer and the SL DRX retransmission timer may not be applied in the groupcast HARQ feedback type 2. That is, the timers may not start.

Also, in the case of a groupcast, the SL HARQ RTT Timer and the SL DRX retransmission timer may not be applied only if the SL HARQ feedback for an SL data transmission is determined to be an ACK or the DTX from all the group member UEs.

Next, adaptive and aperiodic DRX cycles (adoptive/aperiodic DRX cycles) for the aperiodic SL traffic may be indicated.

For example, the Rx UE may not recognize the traffic characteristics of the Tx UE in advance. Therefore, the Rx UE may not know the SL data traffic, and it may be difficult to determine at what frequency the SL data transmission is performed. Here, unlike the U link between the base station and the UE, SL data transmission and reception may be performed by a plurality of UE pairs. Therefore, the UEs may not be able to perform an efficient DRX operation in the case of using an active time based on a periodic operation. In view of the above, the NR SL DRX operation considering aperiodic traffic may be required.

In this case, the transmission type may be considered unicast and groupcast, and may be applied equally to the broadcast method, but is not limited thereto. However, for the convenience of explanation, it is described on the basis of unicast and groupcast. Specifically, it is described based on cases wherein a unicast (PC5 RRC connection) connection is established or the NR SL DRX setting is signaled to the Rx UE by a leader UE or a specific Tx UE in the groupcast.

Here, the Tx UE may provide signaling to the Rx UE on whether to apply a non-periodic/adaptive DRX cycle to the Rx UE in consideration of its own traffic characteristics. For example, signaling whether the DRX cycle is applied may be performed through MAC CE signaling related to an NR SL DRX. Also, the signaling on whether the DRX period is applied may be newly defined in the SCI information at the physical layer and signaled through the PSCCH/PSSCH, and is not limited to the aforementioned example.

A signaling format for whether the DRX cycle is applied may be set. Here, signaling on whether the DRX period is applied may be a SL aperiodic DRX command MAC CE (sl Aperiodic DRX Command MAC CE) based on the MAC CE. However, it is not limited to the above-mentioned name. The LCID field value in the MAC sub header of the SL aperiodic DRX command MAC CE may indicate the SL aperiodic DRX command MAC CE type. Here, there may be one or more of the DRX group configuration information and respective ID values, and one of the DRX group IDs may be indicated through MAC CE signaling.

In addition, for example, the signaling of whether the DRX cycle is applied may be indicated by an aperiodic DRX cycle request field in the SCI. However, this is only an example and is not limited to the above-mentioned names. Here, the corresponding field may be set to 1 bit or more bits. For example, the number of bits in the field may be determined according to the number in the list of the possible DRX cycles set in the higher layer.

Also, the specific higher layer setting values may include parameters related to the start, end, and application time of the aperiodic DRX, and each of the sets including the values may be mapped to each code point of the proposed field. As a specific example, if four parameters are set in one set, the field may be 2 bits. Also, each of the four code points may be mapped to parameter sets, and one set of them may be indicated, and is not limited to the aforementioned example.

Here, if the Rx UE receives a signaling indicating a non-periodic and traffic-adaptive DRX cycle, the Rx UE may set an aperiodic DRX period based on the signaling. As a specific example, the Rx UE may set a SL long DRX period in advance. If the Rx UE receives a signaling indicating an aperiodic and traffic-adaptive DRX cycle, the Rx UE may start an aperiodic DRX cycle (ASDC) that is different from the SL long DRX cycle. The ASDC can be set to wake up more frequently than a SL long DRX cycle. Alternatively, the ASDC may be set to wake up with the SL long DRX cycles and less frequent. That is, the ASDC can be configured with a different period from the SL long DRX period. For example, the start point of the ASDC may be preset or indicated through signaling indicating the DRX period. As another example, the starting point of the ASDC may be set by a higher-layer parameter in advance, and is not limited to the aforementioned example. However, the DRX period already set by the semi-static signaling/preset signaling may correspond to the long DRX period. For example, if a short DRX cycle is set by semi-static/pre-configured signaling, the long DRX cycle is replaced by a short DRX cycle, and the aperiodic DRX cycle scheme can also be applied.

Here, for example, if the starting point of the ASDC is predefined defined, the ASDC may start from the slot (or symbol) immediately following the receiving of the signaling. As another example, if the start point of the ASDC is indicated through the signaling indicating the DRX cycle, the signal indicating the DRX cycle may include information about the start point and the end point of the ASDC.

As a specific example, the start time may be set to an offset time equal to the value of k based on the OFDM symbol n (or slot n+k, k value indicated) or a specific SFN or subframe index value relative to the time of receiving the corresponding signaling.

Also, the end point may be indicated based on the number of set short DRX cycles or the number of long DRX cycles. Here, the end point may be set based on at least one of the physical times, ms units, slot counts, subframe counts, radio frame counts, or timers. The Rx UE may perform aperiodic SCI monitoring based on the aperiodic DRX operation set based on the above.

Also, the adaptive and aperiodic on-duration for aperiodic SL traffic may be established. Alternatively, an adaptive and aperiodic retransmission timer for aperiodic SL traffic may be set. For example, the Tx UE may indicate an aperiodic active time to the Rx UE on which the SL DRX is set in consideration of its service and traffic characteristics. For the aperiodic SL DRX operation, at least one of an aperiodic on-duration, an aperiodic inactivity timer, and an aperiodic retransmission timer value for the active time may be set in the Rx UE. In this case, the signaling formats indicating the SL DRX operation may be set based on at least one of the SL MAC CEs and SCIs (PSCCH/PSSCH) as described above.

Specifically, a signaling format indicating the DRX operation may be set. Here, the signaling indicating the DRX operation may be a SL aperiodic DRX on-duration (inactivity/retransmission timer) command MAC CE (sl Aperiodic DRX onDuration (inactivity/retransmission timer) Command MAC CE) based on the MAC CE. However, it is not limited to the above-mentioned name. The LCID field value in the MAC sub header of the SL aperiodic DRX on-duration (disable/retransmission timer) command MAC CE may indicate the SL aperiodic DRX on-duration (disable/retransmission timer) command MAC CE type. Here, there may be one or more of the DRX group configuration information and respective ID values, and one of the DRX group IDs may be indicated through MAC CE signaling.

Also, for example, it may be indicated by an aperiodic DRX onDuration (inactivity/retransmission timer) request field in the signaling SCI indicating the DRX operation. However, this is only an example and is not limited to the above-mentioned names. Here, the corresponding field may be set to 1 bit or more bits. For example, the number of bits in the field may be determined according to the number in the list of possible DRX cycles set in the higher layer.

Also, the specific higher layer setting values may include parameters for starting, terminating, and applying times of the on-duration (inactivity/retransmission timer), and each of the sets including the values may be mapped to each code point of the proposed field. For example, if four parameters are set in one set, the field may be 2 bits. Also, each of the four code points may be mapped to the parameter sets, and one set of them may be indicated, and is not limited to the aforementioned example.

Here, if the Rx UE receives a signaling indicating an aperiodic and traffic-adaptive DRX on-duration (inactivity/retransmission timer), the Rx UE may set an aperiodic DRX on-duration (inactivity/retransmission timer) based on the signaling.

Specifically, the Rx UE may apply to a partial (or all) DRX cycle from the immediately following symbol (or slot) that receives the signaling. As another example, the Rx UE may be applied to a partial (or all) DRX cycle after the time when the existing on-duration timer ends. Here, the aperiodic DRX on-duration setting may be a value added to the existing on-duration timer value or an alternate value. As another example, the Rx UE may be applied to a partial (or all) DRX cycle after the on-duration interval (or the on-duration for which the corresponding signaling was received) newly set by the on-duration timer value newly indicated by the signaling.

Also, for example, if the Rx UE receives a signal for an aperiodic inactivity timer based on signaling, the Rx UE replaces the existing inactivity timer value and the SCI is received. Here, if the Rx UE receives a PSCCH (target SCI) rule including the SCI, the SL inactivity timer value may be (re) started. Accordingly, if the signaling information about an aperiodic inactivity timer is provided to the Rx UE, the Rx UE may substitute and use a new SL inactivity timer value from the time the SCI is received. Through this, the inactivity timer of the Rx UE can be adjusted adaptively to the service and traffic pattern and scheduling strategy of the Tx UE. Therefore, the SL data scheduling and the power consumption effect of the Rx UE can be maximized.

Also, for example, if the Rx UE receives a signal for a non-periodic retransmission timer for retransmission of the Tx UE, the Rx UE may replace the retransmission timer value with a newly signaled retransmission timer value. Specifically, if the Tx UE performs the retransmission, the retransmission may be performed in a time interval in which the retransmission is expected after the SL HARQ RTT Timer value ends. Here, the time interval in which the retransmission is expected may be started based on the information signaled by the aperiodic SL DRX retransmission timer value. The Rx UE may expect the SL data retransmission (PSCCH/PSSCH) until the corresponding timer value ends.

Also, for example, additional information may be further included in the signaling related to the DRX operation. As a specific example, additional information may include information on whether to apply an aperiodic timer (or inactivity/retransmission timer) up to the number of DRX cycles after receiving the corresponding signaling. As another example, additional information may include information on whether to apply an aperiodic timer (or inactivity/retransmission timer) in any DRX period after receiving the corresponding signaling, and is not limited to the aforementioned example.

Figure 18:
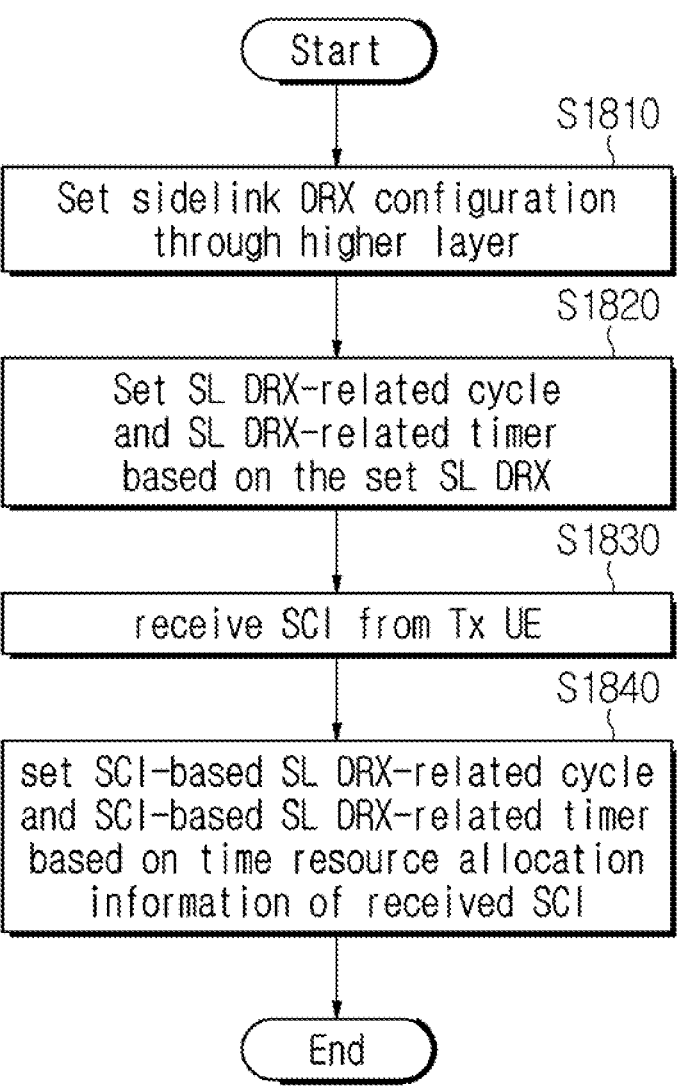
FIG. 18 is a flowchart illustrating a method for supporting an SL DRX operation to which the present disclosure may apply.

FIG. 18 is a flowchart illustrating a method of supporting an SL communication to which the present disclosure may be applied.

Referring to FIG. 18, the UEs performing SL communication may set the SL DRX configuration through the higher layer. (S1810) In this case, the UEs performing SL communication may set the SL DRX-related cycles and the SL DRX-related timers based on the SL DRX configuration. (S1820) Also, other parameters related to the SL DRX configuration may be set to the UEs performing SL communication. For example, the parameters as shown in Table 15 above may be set to the SL UEs in which the NR SL DRX configuration is set by default in the RRC layer.

Next, the Rx UE may receive a target SCI transmitted from the Tx UE. (S1830) Here, the SCI may include the time resource allocation information related to the new data transmission. More specifically, the Rx UE may be instructed to reserve a maximum number of time resources through the target SCI, and may be allocated a plurality of time resources from one SCI. The Rx UE may transmit the data through a plurality of allocated time resources. Here, as described above, an additional SL DRX period may be set in consideration of a plurality of allocated time resources. That is, the Rx UE may set a SCI-based SL DRX-related cycle and an SCI-based SL DRX-related timer based on the time resource allocation information of the received SCI. (S1840) That is, the Tx UE may instruct the Rx UE of an additional SCI-based DRX cycle based on the resource reservation/allocation information in the SCI in addition to the SL long DRX cycle semi-statically set through the higher layer.

Through this, the Rx UE may maintain an active state and receive the data in a plurality of time resources allocated through the SCI.

Figure 19:
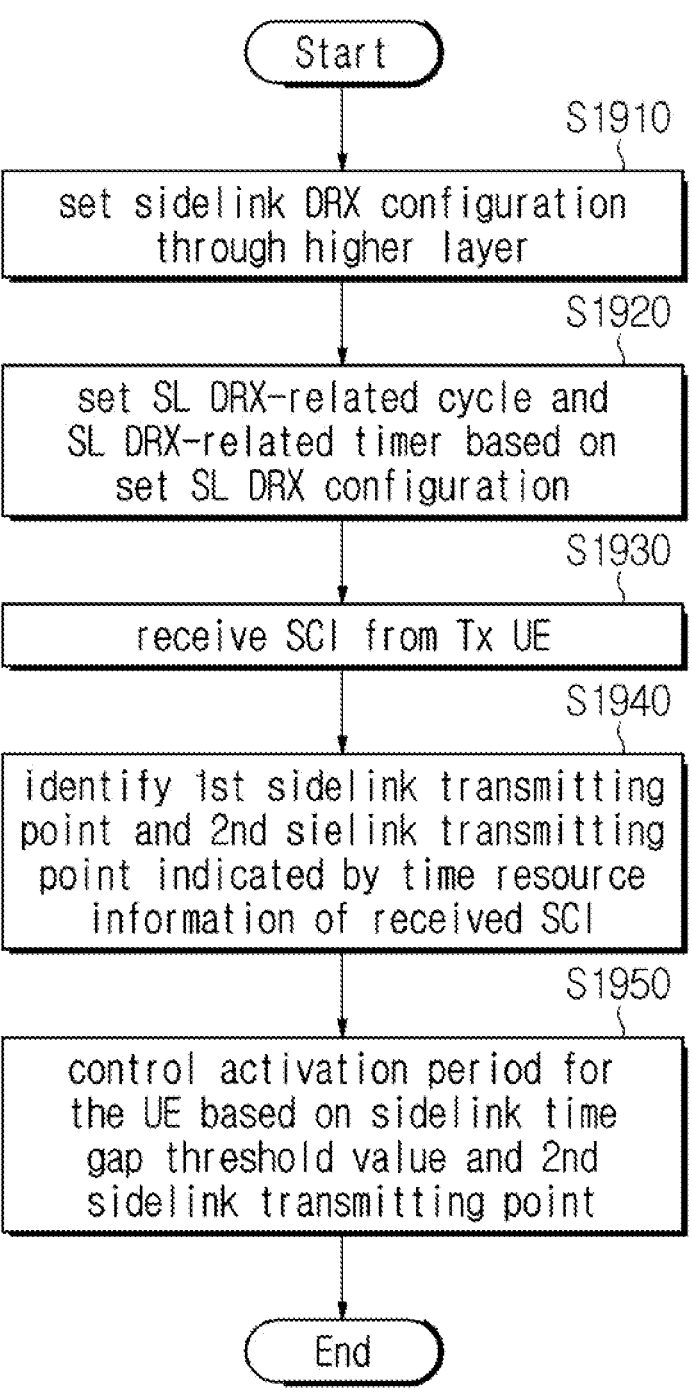
FIG. 19 is a flowchart illustrating a method for supporting an SL DRX operation to which the present disclosure may apply.

FIG. 19 is a flowchart illustrating a method of supporting an SL communication to which the present disclosure may be applied.

Referring to FIG. 19, the UEs performing SL communication may set the SL DRX configuration through the higher layer. (S1910) In this case, the UEs performing SL communication may set the SL DRX-related cycles and the SL DRX-related timers based on the SL DRX configuration. (S1920) Also, other parameters related to the SL DRX configuration may be set to the UEs performing SL communication. For example, the parameters as shown in Table 15 above may be set to SL UEs in which the NR SL DRX configuration is set by default in the RRC layer.

Next, the Rx UE may receive a target SCI transmitted from the Tx UE. (S1930) Here, the SCI may include the time resource allocation information related to the new data transmission. For example, the Rx UE may check the time of the first SL transmission and the second SL transmission time indicated by the time resource allocation information of the received SCI. (S1940) Here, the first SL transmission time may be a time resource through which the data is first transmitted by the SCI, and the second SL transmission time may mean the next time resource after the first transmission resource. Also, for example, if the time resource allocation information of the S CI indicates a plurality of time resources, there may be more SL transmission times, and is not limited to the aforementioned example. Here, the SL UEs may have a SL inactivity timer set based on the SL DRX configuration. The SL inactivity timer may be started by the received SCI, and when the SL inactivity timer expires, the SL UEs may be converted to a sleep state. Here, as described above, a plurality of time resources may be indicated by the SCI, and the UE may need to maintain an active state in the corresponding time resources. In consideration of the aforementioned points, a SL time gap threshold value for extending the SL inactivity timer is defined, and an NR SL DRX operation may be performed based thereon. The SL time gap threshold value may be signaled by the Tx UE to the Rx UE through at least one of the higher layer and SCI signaling. In this case, the receiving UE may control the active interval for the UE based on the SL time gap threshold value and the second SL transmission time. (S1950) More specifically, the SL time gap threshold value may be compared with the time interval between the time when the SL inactivity timer ends and the second SL transmission resource (second SL transmission time). As another example, the SL time gap threshold value may be compared with the time interval between the first SL transmission resource (at the time of the first SL transmission) and the second SL transmission resource (at the time of the second SL transmission).

In this case, if the aforementioned time interval is less than the SL time gap threshold value, the SCI monitoring time of the Rx UE may be extended to the next retransmission slot even if the inactivity timer expires. As another example, if the aforementioned time interval is less than the SL time gap threshold value, the SL inactivity timer value may be extended by the time corresponding to the interval between the SL inactivity timer and the next SL data retransmission reception slot after the SL inactivity timer expires. Also, if there is an additional time resource for the same TB transmission, and the aforementioned time interval is less than the SL time gap threshold value, the SL inactivity timer value may be extended by the time corresponding to the interval to the additional time resource after the SL inactivity timer expires, and is not limited to the aforementioned example.

Figure 20:
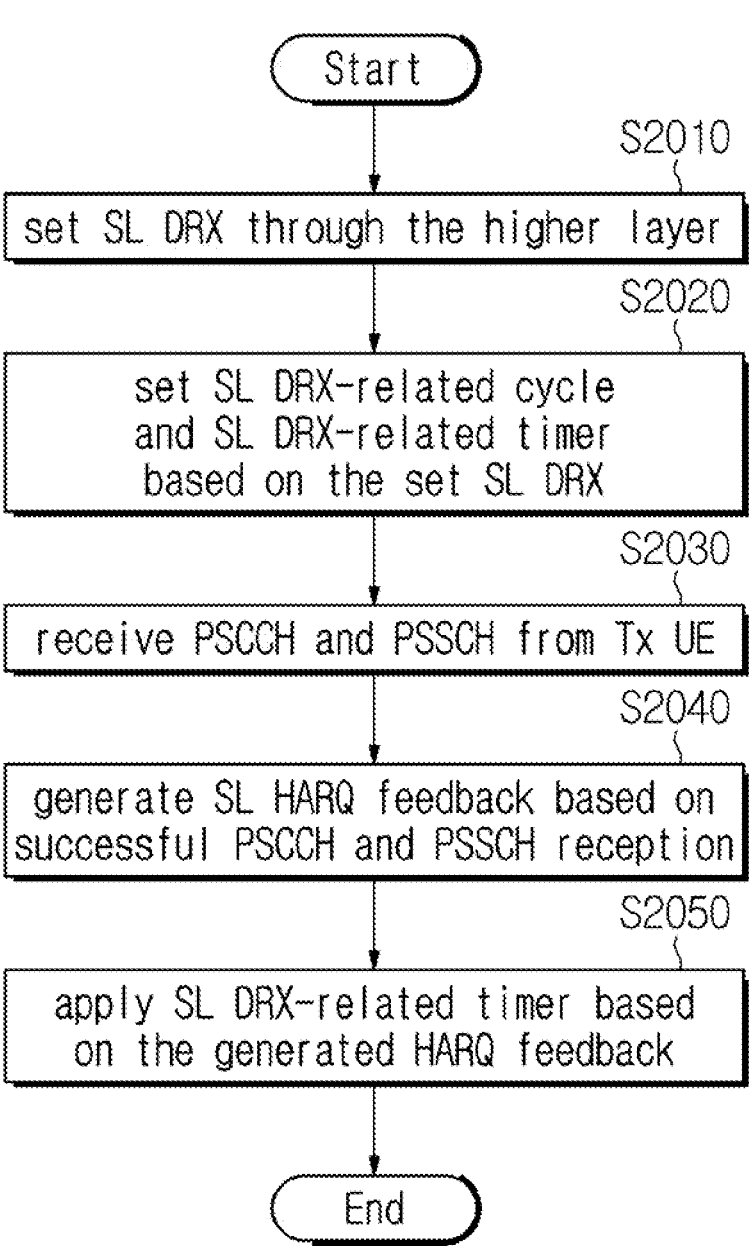
FIG. 20 is a flowchart illustrating a method for supporting a SL communication to which the present disclosure may apply.

FIG. 20 is a flowchart illustrating a method of supporting the SL communication to which the present disclosure may be applied.

Referring to FIG. 20, the UEs performing the SL communication may set the SL DRX configuration through the higher layer. (S2010) In this case, the UEs performing the SL may set the SL DRX-related cycles and the SL DRX-related timers based on the SL DRX configuration. (S2020) Also, other parameters related to the SL DRX configuration may be set to the UEs performing the SL communication. For example, the parameters as shown in Table 15 above may be set to the SL UEs in which the NR SL DRX configuration is set by default in the RRC layer.

Next, the Rx UE may receive the PSCCH and the PSSCH from the Tx UE. (S2030) That is, the Rx UE may receive the SL data transmitted from the Tx UE. Thereafter, the Rx UE generates the HARQ feedback information (S2040) based on the success of the PSCCH and the PSSCH reception, and applies an SL DRX-related timer based on the generated HARQ feedback and the SL DRX configuration process. (S2050) Here, the SL DRX configuration process may be an additional SL DRX configuration that is different from the SL DRX configuration of S2010. For example, the UE may set an additional NR SL DRX configuration independent of the SL DRX configuration set by default. Additional NR SL DRX configurations may be configured independently for some UEs (e.g., per UE, per direction (link)-specific or per peer UEs), resource pools, QoS classes (PQI), service types (e.g., PSID/ITS-AID) or LCHs.

As a more specific example, a common NR SL DRX configuration may be set to enable minimal data transmission and reception between the SL UEs in a resource pool in which the NR SL DRX configuration is set by default. Here, the common NR SL DRX configuration is configured between the UEs (e.g. per UE, per direction (link)-specific or per peer UEs unicast/groupcast), resource pools, QoS (Quality of Service) classes (PC5 QoS Identifier, PQI), service types (e.g., PSID/ITS-AID) or LCHs (Logical Channel) may be configured independently. Also, the UE may additionally set an independent NR SL DRX configuration. Here, the additional NR SL DRX configuration may be configured independently for some UEs (e.g., per UE, per direction (link)-specific or per peer UEs), resource pools, QoS classes (PQI), service types (e.g. PSID/ITS-AID) or LCHs.

That is, a common NR SL DRX configuration and an independent NR SL DRX configuration may be additionally set in the UE, as described above.

For example, if the UE sets an additional NR SL DRX configuration, the UE may set the NR SL DRX configuration in consideration of the generated HARQ feedback. In this case, as shown in FIG. 14 above, if the Rx UE does not succeed in receiving the PSCCH and the PSSCH, the Rx UE may transmit a NACK on the PSFCH transmission resource. In this case, the SL HARQ RTT Timer and the SL DRX retransmission timer may be applied for each SL HARQ process. That is, for each SL HARQ process, a SL HARQ RTT Timer and a SL DRX retransmission timer may be set. For example, the SL RTT timer value and the SL DRX retransmission timer value may be determined as any one of a plurality of values based on at least one of the QoS class (e.g. PQI, priority level), QoS feature (e.g.PDB), LCH, and cast type of the SL data transmitted and received through the corresponding SL HARQ process, as described above.

Also, for example, if the Tx UE transmits a NACK to the Rx UE, the Tx UE may again report the SL HARQ feedback information to the base station as a Uu channel/signal. Here, the SL HARQ RTT timer starts from the first symbol after the Tx UE reports the SL HARQ feedback information to the base station, or the Rx UE regardless of the SL HARQ feedback information reports to the base station.

Figure 16:
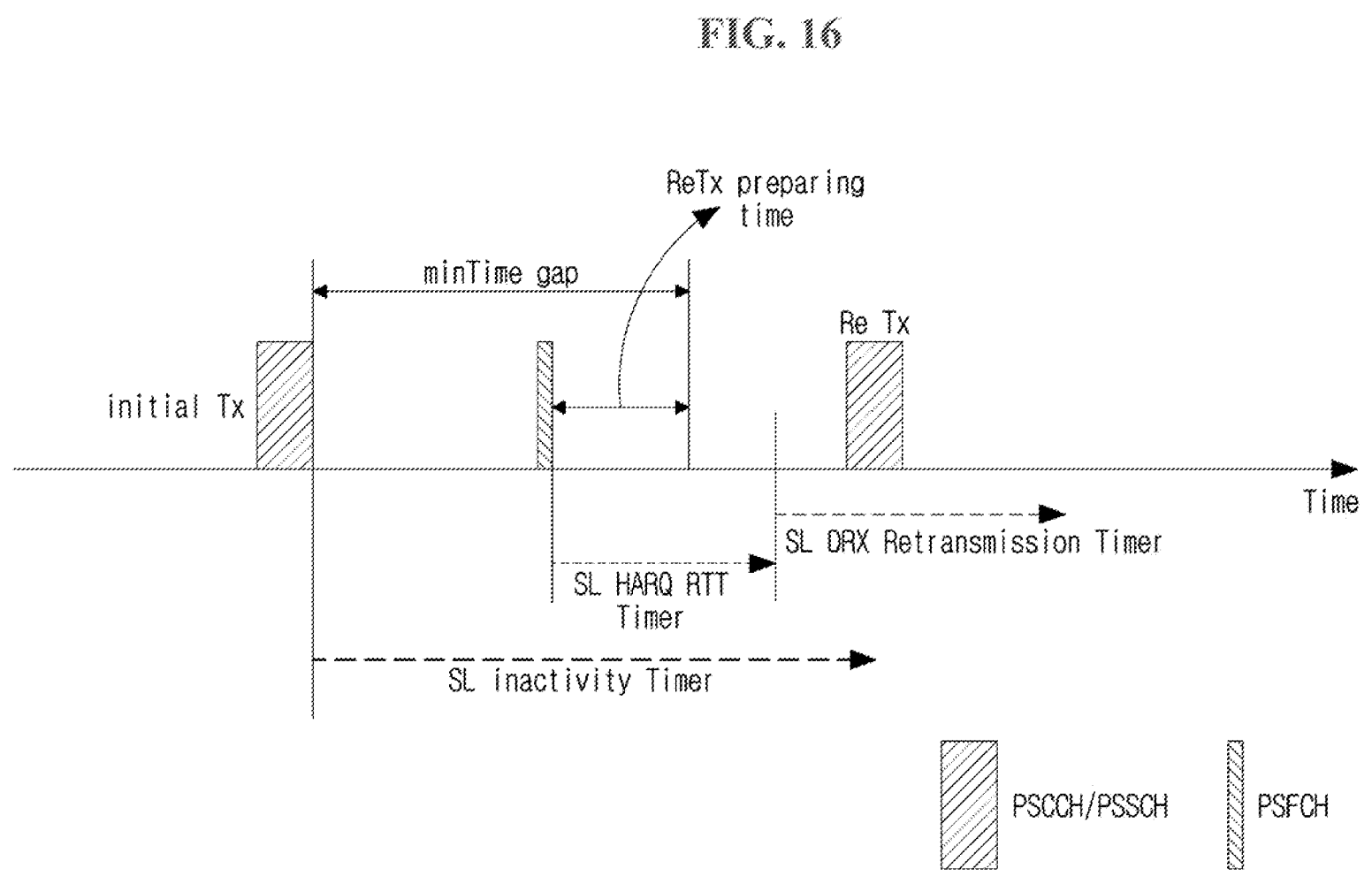

Also, for example, the HARQ RTT timer value set based on the HARQ feedback may be determined in consideration of the minimum time gap (minTime gap) or the ReTx preparation time (ReTx preparing time). Here, the minimum time gap may be the minimum time interval that the SL UE must consider between one PSSCH transmission and a plurality of time resources for the PSSCH transmission for subsequent retransmission. That is, the minimum interval includes the time interval between the end of the last symbol of the first PSSCH transmission to the first symbol of the associated PSFCH reception and the necessary physical channel transmission preparation time for the PSFCH reception and retransmission (e.g., Tx-Rx switching, multiplexing). Also, the retransmission preparation time may be set based on a time including a time (e.g., Tx-Rx switching, multiplexing) to prepare for the PSFCH reception and retransmission required for retransmission, as shown in FIG. 16.

Figure 17:
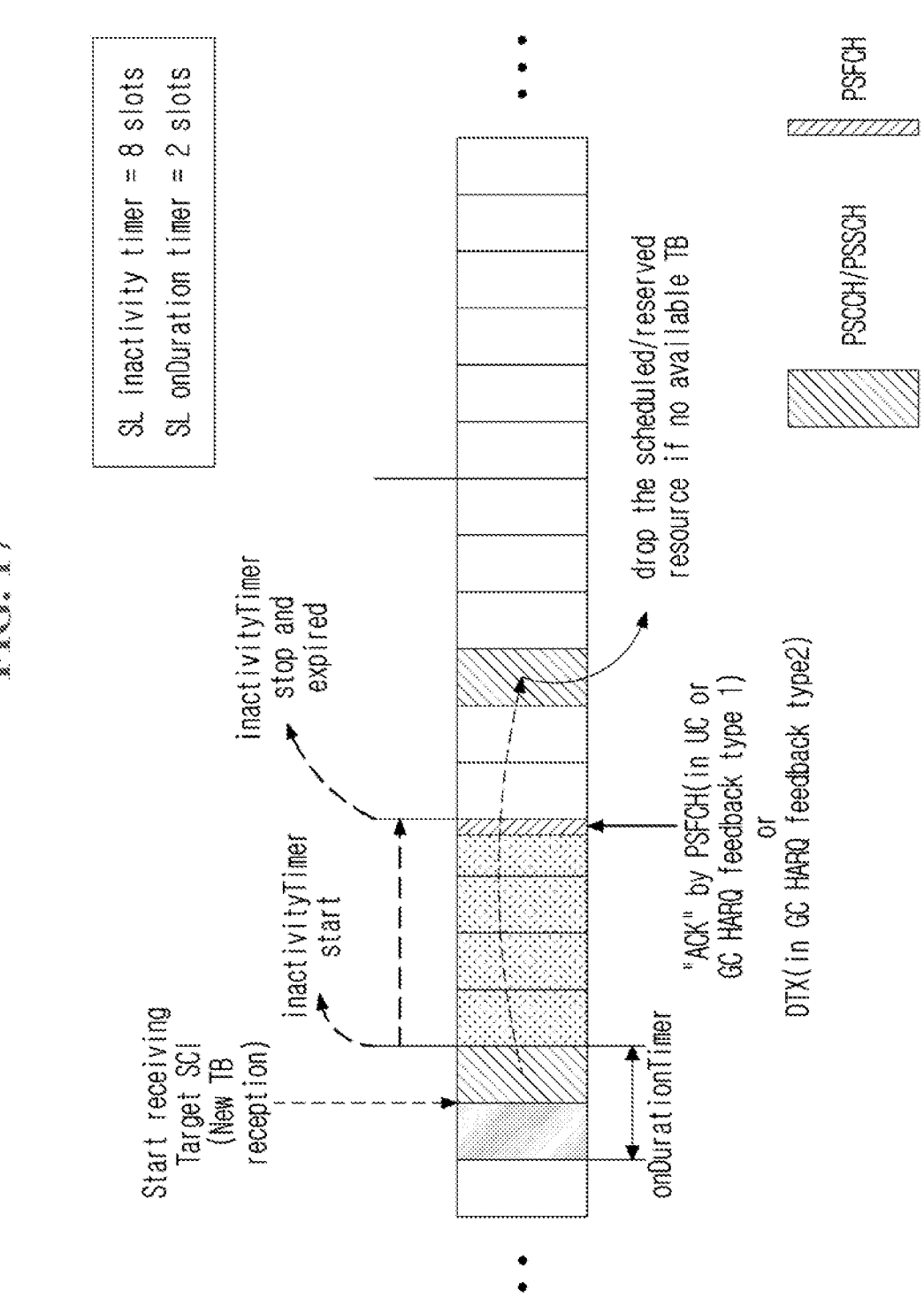
FIG. 17 illustrates a method for controlling a timer based on ACK information to which the present disclosure may apply.

As another example, if the Rx UE succeeds in receiving the PSCCH and the PSSCH, the Rx UE may feedback the ACK on the PSFCH resource to the Tx UE. (Groupcast HARQ feedback type 2 is DTX) In this case, both the Rx UE transmitting the ACK and the Tx UE receiving the same may no longer count the SL inactivity timer. That is, the Rx UE may interrupt or expire the SL inactivity timer based on the judgment on the ACK, which is shown in FIG. 17.

Figure 21:
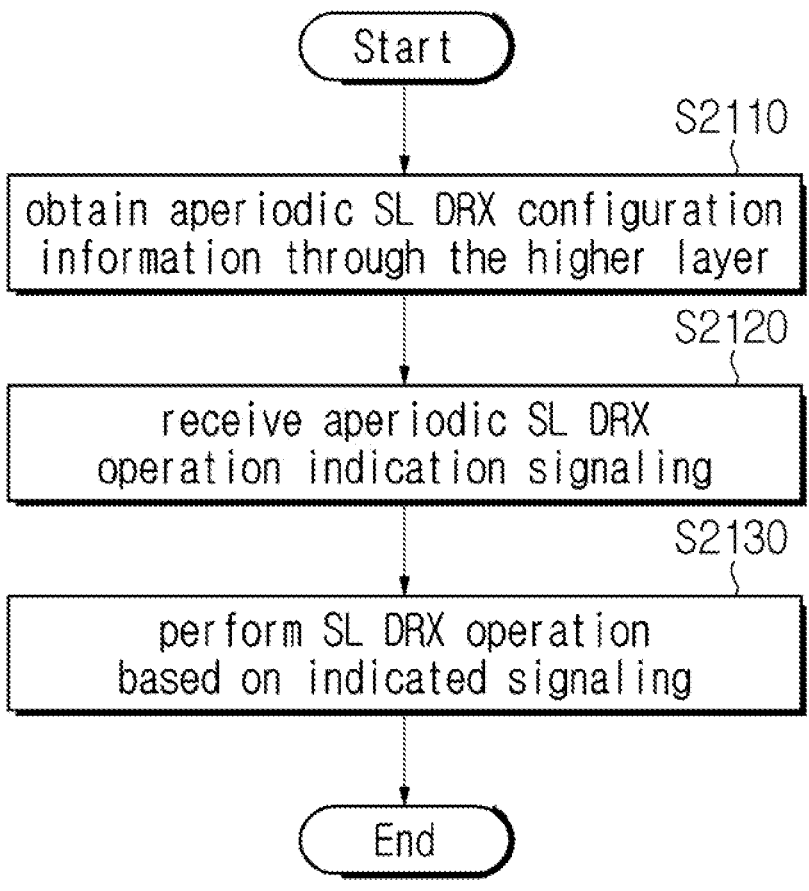
FIG. 21 is a flowchart illustrating a method for setting an aperiodic DRX configuration to which the present disclosure may apply.

FIG. 21 is a flowchart illustrating a method of setting an aperiodic DRX configuration to which the present disclosure can be applied.

Referring to FIG. 21, the UE may be instructed to configure an adaptive/aperiodic SL DRX for aperiodic SL traffic. For example, if the UEs performing the SL communication use an active time based on periodic operation, efficient DRX operation may not be performed, and for this, the NR SL DRX operation considering aperiodic traffic may be required.

Here, the UE may obtain aperiodic SL DRX configuration information through the higher layer. (S2110) The SL DRX configuration information may include an aperiodic SL DRX cycle and aperiodic active time information (on-duration, inactivity/retransmission timer). For example, the UE may obtain list information on a configurable SL DRX configuration through the higher layer. Thereafter, the UE may receive an SL DRX operation indication signaling indicating whether to apply a non-periodic/adaptive DRX configuration. (S2120) The SL DRX operation indication signaling may be indicated based on at least any one of the newly defined fields in the MAC CE and SCI information related to the SL DRX.

Here, if the Rx UE receives a signaling indicating an aperiodic and traffic-adaptive SL DRX cycle, the Rx UE may perform an aperiodic SL DRX operation based on the signaling. (S2130) That is, the Rx UE may start a different aperiodic SL DRX cycle from the basic SL DRX cycle (e.g. SL DRX long cycle), which is described above. Also, for example, the Rx UE may operate an on-duration timer (or inactivity/retransmission timer) different from the basic on-duration timer, as described above.

Figure 22:
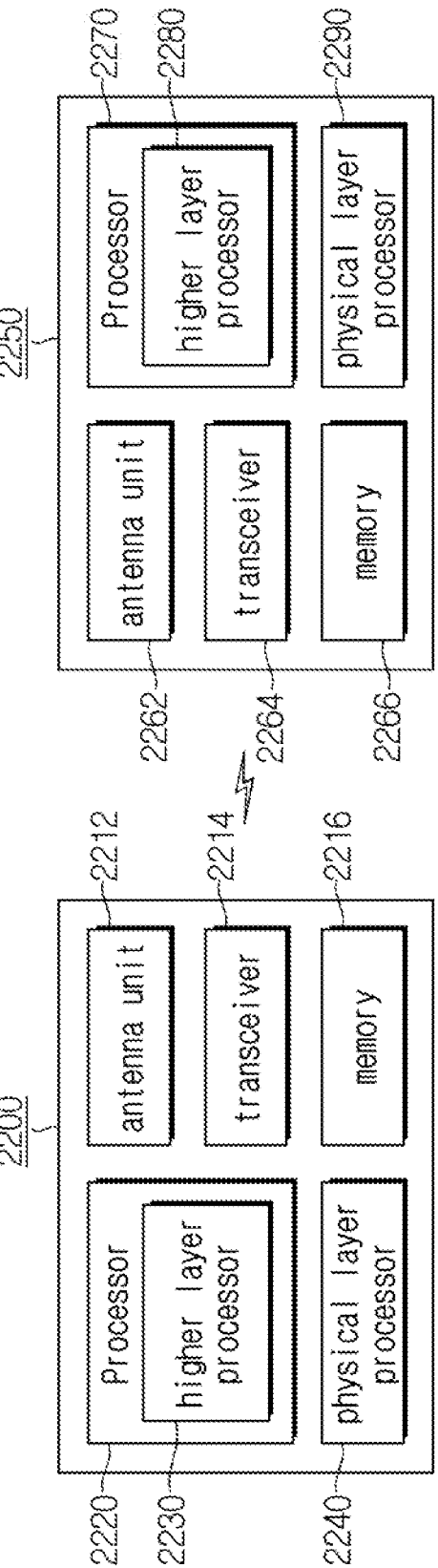
FIG. 22 is a diagram illustrating a base station device and a UE device to which the present disclosure may apply.

FIG. 22 is a diagram illustrating a base station apparatus and a UE apparatus to which the present disclosure may be applied.

The base station device 2200 may include a processor 2220, an antenna unit 2212, a transceiver 2214, and a memory 2216.

The processor 2220 performs a baseband-related signal processing and may include a a higher-layer processor 2230 and a physical layer processor 2240. The higher layer processor 2230 may process the operation of a medium access control (MAC) layer, a radio resource control (RRC) layer, or a higher layer thereof. The physical layer processor 2240 may process the operation of the physical (PHY) layer (e.g., uplink receive signal processing, downlink transmission signal processing). Also, to perform baseband-related signal processing, the processor 2220 may also control the operation of the base station device 2200 as a whole.

The antenna unit 2212 may include one or more physical antennas, and may support the multiple input multiple output (MIMO) transmission and reception in the case of including a plurality of antennas. Also, beamforming can be supported.

The memory 2216 may store computationally processed information of the processor 2220, software, operating systems, applications, and the like, related to the operation of the base station device 2200, and may include components such as buffers.

The processor 2220 of the base station 2200 may be configured to implement the operation of the base station in the example described herein.

The UE device 2250 may include a processor 2270, an antenna unit 2262, a transceiver 2264, and a memory 2266. For example, in the present invention, the UE device 2250 may perform communication with the base station device 2200. As another example, in the present invention, the UE device 2250 may perform SL communication with another UE device. That is, the UE device 2250 of the present invention refers to a device capable of communicating with at least one of the base station devices 2200 and the other UE devices and is not limited to communication with a specific device.

The processor 2270 performs baseband-related signal processing and may include a higher-layer processor 2280 and a physical layer processor 2290. The higher layer processor 2280 may process the operation of the MAC layer, the RRC layer, or the higher layer. The physical layer processor 2290 may process the operations of the PHY layer (e.g., downlink receive signal processing, uplink transmission signal processing). Also, to perform baseband-related signal processing, the processor 2270 may also control the operation of the UE device 2250 as a whole.

The antenna unit 2262 may include one or more physical antennas, and may support MIMO transmission and reception in the case of including a plurality of antennas. Also, beamforming can be supported.

The memory 2266 may store computationally processed information of the processor 2270, software, operating systems, applications, and the like, related to the operation of the UE device 2250, and may include components such as buffers.

Here, the processor 2270 of the UE device 2250 may set the SL DRX configuration through the higher layer. In this case, an SL DRX-related cycle and an SL DRX-related timer may be set based on the SL DRX configuration. Also, the processor 2270 of the UE device 2250 may receive a target SCI transmitted from another UE (e.g., Tx UE) through the antenna unit 2262. Here, the SCI may include time resource allocation information related to the new data transmission. In this case, the processor 2270 of the UE device 2150 may be allocated a plurality of time resources from one SCI, and may perform a data transmission based thereon. Also, the processor 2270 of the UE device 2150 may additionally set a SCI-based SL DRX-related cycle and a SCI-based SL DRX-related timer based on the time resource allocation information of the SCI received. Through this, the processor 2270 of the UE device 2250 may maintain an active state and receive data from a plurality of time resources allocated through the SCI.

Also, the processor 2270 of the UE device 2250 confirms a plurality of time resources indicated by the time resource allocation information of the received SCI, and the SL time gap threshold value for maintaining an active interval. In this case, the processor 2270 of the UE device 2250 may compare the SL time gap threshold value with the time interval between the time when the SL inactivity timer is terminated and the second SL transmission resource (second SL transmission time). Also, for example, the processor 2270 of the UE device 2250 may compare the SL time gap threshold value with the time interval between the first SL transmission resource (the first SL transmission time) and the second SL transmission resource (the second SL transmission time).

In this case, if the aforementioned time interval is less than the SL time gap threshold value, the processor 2270 of the UE device 2250 may extend the SCI monitoring time to the next retransmission slot even if the inactivity timer expires. As another example, if the aforementioned time interval is less than the SL time gap threshold value, the SL inactivity timer value may be extended by the time corresponding to the interval between the SL inactivity timer and the next SL data retransmission receiving slot after the SL inactivity timer expires. Also, if there is an additional time resource for the same TB transmission, and the aforementioned time interval is less than the SL time gap threshold value, the SL inactivity timer value may be extended by the time corresponding to the interval to the additional time resource after the SL inactivity timer expires, and is not limited to the aforementioned example.

The UE device 2250 according to an example of the present invention may be associated with a vehicle. For example, the UE device 2250 may be integrated into the vehicle, located in the vehicle, or located on the vehicle. Also, the UE device 2250 according to the present invention may be a vehicle itself. Also, the UE device 2250 according to the present invention may be at least one of a wearable UE, an AV/VR, an IoT UE, a robot UE, and a public safety UE. The UE device 2250 to which the present invention is applicable may include various forms of the communication devices in which interactive services using SLs are supported for services such as Internet access, service performance, navigation, real-time information, autonomous driving, safety, and risk diagnosis. Also, any type of communication device capable of the SL operation may be included in an AR/VR apparatus or sensor, performing a relay operation.

Here, the vehicles to which the present invention applies may include autonomous vehicles, semi-autonomous vehicles, non-autonomous vehicles, and the like. On the other hand, the UE device 2250 according to an example of the present invention is described as being associated with a vehicle, but one or more of the UEs may not be associated with a vehicle. This is an example, and should not be construed so that the application of the present invention is limited according to the examples described.

Also, the UE device 2250 according to an example of the present invention may include various types of communication devices that can perform the cooperation of supporting interactive services using SLs. That is, the UE device 2550 may be used not only to support an interactive service using a direct SL but also as a cooperative device to support an interactive service using a SL.

Also, various examples of the present disclosure may be implemented by hardware, firmware, software, or a combination thereof. In the case of implementation by hardware, the examples may be implemented by one or more application-specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc.

The scope of the present disclosure includes software or machine-executable instructions (e.g., OS, application, firmware, program, etc.) such that the operations of the method of the various examples may be executed on an apparatus or a computer, and a non-transitory computer-readable medium storing such software or instructions to be executable on an apparatus or a computer.

Various examples of the present disclosure are to explain the representative aspects of the present disclosure rather than listing all the possible combinations and matters described in the various examples may be applied alone or in combination of at least two of the examples.

What is claimed is:

1. A method performed by a first wireless user device, the method comprising:
   determining at least one sidelink (SL) discontinuous reception (DRX) configuration for SL communication between the first wireless user device and at least one second wireless user device, wherein the at least one SL DRX configuration comprises at least one of:
      an SL DRX configuration for a first cast type; or
      an SL DRX configuration for a second cast type;
   transmitting, to the at least one second wireless user device and based on the at least one SL DRX configuration, SL information during a SL DRX active time of the at least one second wireless user device, wherein the SL information comprises:
      first SL control information (SCI) comprised in a physical SL control channel (PSCCH); and
      second SCI comprised in a physical SL shared channel (PSSCH); and
   receiving, from the at least one second wireless user device, an SL hybrid automatic repeat request (HARQ) feedback via a physical SL feedback channel (PSFCH),
   wherein the at least one SL DRX configuration is configured for each direction and configured per pair of a source identifier (ID) and a destination ID.

2. The method of claim 1, wherein the SL HARQ feedback is associated with the PSSCH, and
   wherein the at least one SL DRX configuration is determined based on:
      SL DRX configuration information received from a base station; or
      SL DRX configuration information preconfigured in the first wireless user device.

3. The method of claim 1, further comprising:
   while the first wireless user device is in a radio resource control (RRC)-connected mode, receiving, from a base station, SL DRX configuration information for configuring the at least one SL DRX configuration, wherein the SL DRX configuration information is received via dedicated RRC signaling.

4. The method of claim 1, further comprising:
while the first wireless user device is in a radio resource control (RRC)-inactive mode or an RRC idle mode, receiving, from a base station, SL DRX configuration information for configuring the at least one SL DRX configuration, wherein the SL DRX configuration information is received via system information block (SIB).

5. The method of claim 1, further comprising:
transmitting, from a radio resource control (RRC) layer to a medium access control (MAC) layer, at least one SL DRX parameter comprising:
an SL DRX on-Duration timer;
an SL DRX slot offset;
an SL DRX inactivity timer;
an SL DRX retransmission timer; and
an SL DRX HARQ round-trip time (RTT) timer.

6. The method of claim 5, wherein the SL DRX retransmission timer and the SL DRX HARQ RTT timer are configured per SL HARQ process.

7. The method of claim 5, wherein the SL DRX active time of the at least one second wireless user device comprises at least one of:
periodic resources for SL transmission;
a time in which an SL DRX on-Duration timer is running;
a time in which an SL DRX inactivity timer is running; or
a time in which an SL retransmission timer is running.

8. The method of claim 1, further comprising:
transmitting, based on a negotiation between the first wireless user device and the at least one second wireless user device, at least one SL DRX parameter to a base station.

9. The method of claim 1, wherein:
the determining the at least one SL DRX configuration comprises determining, based on a negotiation between the first wireless user device and the at least one second wireless user device, the at least one SL DRX configuration;
the at least one SL DRX configuration comprises an SL DRX configuration for unicast as the SL DRX configuration for the first cast type;
the at least one second wireless user device is a reception (RX) user device;
the at least one SL DRX configuration is configured comprises sidelink DRX timers for each direction and configured per pair of the source ID and the destination ID; and
the sidelink DRX timers comprise:
a first sidelink DRX timer for sidelink communication from the first wireless user device to another wireless user device, wherein the first wireless user device and the other wireless use device are associated with the pair of the source ID and the destination ID; and
a second sidelink DRX timer for sidelink communication from the other wireless user device to the first wireless user device.

10. The method of claim 9, further comprising:
transmitting, from the first wireless user device to the RX user device, the SL DRX configuration for unicast, wherein the at least one SL DRX configuration is configured per SL process.

11. The method of claim 1, wherein:
the at least one SL DRX configuration comprises at least one of:
an SL DRX configuration for groupcast as the SL DRX configuration for the second cast type; or
an SL DRX configuration for broadcast as the SL DRX configuration for the second cast type;
the at least one second wireless user device comprises a plurality of reception (RX) user devices; and
the at least one SL DRX configuration comprises a common SL DRX configuration for the plurality of RX user devices.

12. The method of claim 11, wherein:
the at least one SL DRX configuration is configured based on quality of service (QoS) profile; and
the at least one SL DRX configuration is configured per SL process.

13. The method of claim 1, further comprising:
after a slot in which the SL information is transmitted, starting, based on the first SCI and the second SCI indicating a new SL transmission, an SL DRX inactivity timer.

14. The method of claim 1, further comprising:
starting, based on an SL DRX HARQ round-trip time (RTT) timer being expired, an SL DRX retransmission timer,
wherein the SL HARQ feedback comprises a negative acknowledgement (NACK).

15. The method of claim 1, further comprising:
based on the SL HARQ feedback comprising a negative acknowledgement (NACK), transmitting, to a base station, SL HARQ feedback information via a physical uplink control channel (PUCCH); and
starting, based on an SL DRX HARQ round-trip time (RTT) timer being expired, an SL DRX retransmission timer.

16. The method of claim 15, further comprising:
starting the SL DRX HARQ RTT timer in a first symbol after the SL HARQ feedback information is transmitted to a base station.

17. The method of claim 1, further comprising:
starting an SL DRX HARQ round-trip time (RTT) timer in a first symbol after the receiving the SL HARQ feedback, wherein the SL HARQ feedback comprises a negative acknowledgement (NACK), and wherein the SL DRX HARQ RTT timer is applied based on an SL retransmission timing.

18. A method performed by a second wireless user device, the method comprising:
determining at least one sidelink (SL) discontinuous reception (DRX) configuration for SL communication between a first wireless user device and the second wireless user device, wherein the at least one SL DRX configuration comprises at least one of:
an SL DRX configuration for a first cast type; or
an SL DRX configuration for a second cast type;
receiving, from the first wireless user device and based on the at least one SL DRX configuration, SL information during a SL DRX active time of the second wireless user device, wherein the SL information comprises:
first SL control information (SCI) comprised in a physical SL control channel (PSCCH); and
second SCI comprised in a physical SL shared channel (PSSCH); and
transmitting, to the first wireless user device, an SL hybrid automatic repeat request (HARQ) feedback via a physical SL feedback channel (PSFCH), wherein the at least one SL DRX configuration is configured for each direction and configured per pair of a source identifier (ID) and a destination ID.

19. The method of claim 18, further comprising:

transmitting, from a radio resource control (RRC) layer to a medium access control (MAC) layer, at least one SL DRX parameter comprising:

an SL DRX on-Duration timer;

an SL DRX slot offset;

an SL DRX inactivity timer;

an SL DRX retransmission timer; and an SL DRX HARQ round-trip time (RTT) timer.

20. The method of claim 1, wherein:

the determining the at least one SL DRX configuration comprises determining, based on a negotiation between the first wireless user device and the second wireless user device, the at least one SL DRX configuration;

the at least one SL DRX configuration comprises sidelink DRX timers for each direction and configured per pair of the source ID and the destination ID; and the sidelink DRX timers comprise:

a first sidelink DRX timer for sidelink communication from the first wireless user device to another wireless user device, wherein the first wireless user device and the other wireless use device are associated with the pair of the source ID and the destination ID; and a second sidelink DRX timer for sidelink communication from the other wireless user device to the first wireless user device.

\* \* \* \* \*